(12) United States Patent
Tada et al.

(10) Patent No.: US 7,751,650 B2
(45) Date of Patent: Jul. 6, 2010

(54) IMAGE PROCESSING DEVICE IMAGE PROCESSING PROGRAM AND IMAGE PROCESSING METHOD

(75) Inventors: Naoki Tada, Kanagawa (JP); Kouichiro Takashima, Tokyo (JP)

(73) Assignees: Sony Corporation, Tokyo (JP); Sony Ericsson Mobile Communications Japan, Tokyo (JP)

(*) Notice: Subject to any disclaimer, the term of this patent is extended or adjusted under 35 U.S.C. 154(b) by 1169 days.

(21) Appl. No.: 10/507,096

(22) PCT Filed: Mar. 3, 2003

(86) PCT No.: PCT/JP03/02412

§ 371 (c)(1),
(2), (4) Date: Sep. 3, 2004

(87) PCT Pub. No.: WO03/075146

PCT Pub. Date: Sep. 12, 2003

(65) Prior Publication Data

US 2005/0168566 A1    Aug. 4, 2005

(30) Foreign Application Priority Data

Mar. 5, 2002 (JP) ............................. 2002-059118
Mar. 28, 2002 (JP) ............................. 2002-092782

(51) Int. Cl.
*G06K 9/36* (2006.01)
*H04M 1/00* (2006.01)
*H04M 9/00* (2006.01)
*G06F 3/033* (2006.01)
*G09G 5/08* (2006.01)

(52) U.S. Cl. ............. 382/285; 379/433.07; 379/433.06; 345/163; 345/167

(58) Field of Classification Search ....................... None
See application file for complete search history.

(56) References Cited

U.S. PATENT DOCUMENTS 6,587,091 B2 * 7/2003 Serpa .......................... 345/156

(Continued)

FOREIGN PATENT DOCUMENTS

JP            2 266415         10/1990

(Continued)

*Primary Examiner*—Vikkram Bali
*Assistant Examiner*—Michelle Entezari
(74) *Attorney, Agent, or Firm*—Frommer Lawrence & Haug LLP; William S. Frommer; Ellen Marcie Emas

(57) ABSTRACT

The present invention relates to an image processing apparatus and an image processing program, and an image processing method for making various operations be performed more comfortably. A rotation input section 14 is provided substantially at the center of a mobile phone 1. When the rotation input section 14 is rotated in a clockwise or counterclockwise direction, an image displayed on a display section 13 is rotated to be displayed. In addition, when the rotation input section 14 is pressed at an upper, lower, left or right portion thereof toward inside of the mobile phone 1, a display range of the image displayed on the display section 13 is switched. For example, in a case where a map is displayed, the map is rotated when the rotation input section 14 is rotated, and the map is scaled up/down when a predetermined position of the rotation input section 14 is pressed. The present invention may be applied to mobile phones.

12 Claims, 27 Drawing Sheets

U.S. PATENT DOCUMENTS

| | | | |
|---|---|---|---|
| 6,593,914 B1 * | 7/2003 | Nuovo et al. | 345/169 |
| 6,697,050 B1 * | 2/2004 | Shinohe et al. | 345/163 |
| 7,146,005 B1 * | 12/2006 | Anft et al. | 379/433.06 |
| 7,295,187 B2 * | 11/2007 | Kaizaki et al. | 345/167 |
| 2002/0054017 A1 * | 5/2002 | Agata et al. | 345/157 |
| 2002/0054106 A1 * | 5/2002 | Mugura et al. | 345/764 |
| 2002/0054151 A1 * | 5/2002 | Inomata et al. | 345/810 |
| 2002/0149621 A1 * | 10/2002 | Yamaguchi et al. | 345/764 |
| 2004/0027793 A1 * | 2/2004 | Haraguchi et al. | 361/683 |

FOREIGN PATENT DOCUMENTS

| | | |
|---|---|---|
| JP | 7-92939 | 4/1995 |
| JP | 7 295739 | 11/1995 |
| JP | 8-18632 | 1/1996 |
| JP | 8-161103 | 6/1996 |
| JP | 10-254614 | 9/1998 |
| JP | 2001-036772 | 2/2001 |
| JP | 2001-92582 | 4/2001 |
| JP | 2001-159946 | 6/2001 |
| JP | 2001-184158 | 7/2001 |
| JP | 2001-350561 | 12/2001 |
| WO | WO0119057 * | 3/2001 |
| WO | WO 01/27733 | 4/2001 |

* cited by examiner

FIG.29
CROSS DIRECTION PRESS
→IMAGE MOVE
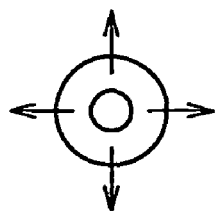
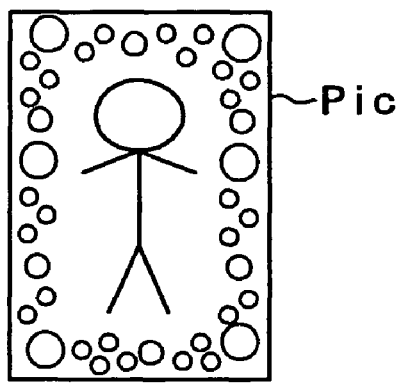
Pic
DIAL ROTATION
→FRAME SELECTION
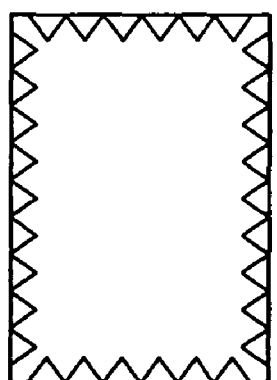
F1
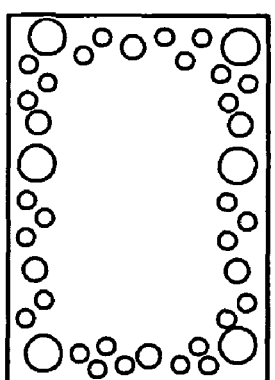
F2
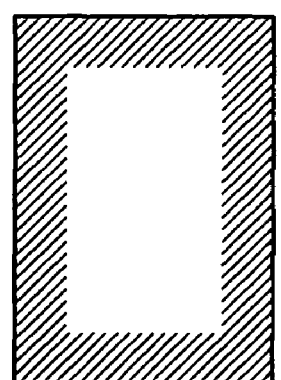
F3

IMAGE PROCESSING DEVICE IMAGE PROCESSING PROGRAM AND IMAGE PROCESSING METHOD

TECHNICAL FIELD

The present invention relates to an image processing apparatus and an image processing program, and an image processing method, particularly preferable for use in a mobile phone apparatus.

BACKGROUND ART

In recent years, users have acquired and utilized various contents in portable information terminals such as mobile phones or PDAs (Personal Digital Assistants).

This allows a user, for example, to enjoy an acquired game without limitations on locations or in time, and to acquire map data for use with a GPS (Global Positioning System) function to check the current position of himself/herself.

In this case, for example, control of behaviors of a main character a of the game or checking of a route to a destination on the map are typically performed by operating up, down, left, and right buttons provided on a terminal or buttons around them according to the situation.

On the other hand, for mobile phones in recent years, mobile phones with cameras having a function of capturing images have been put into practical use associated with improved performance. In a mobile phone with a camera, an image can be captured through a built-in camera section and the captured image can be displayed in a display section or attached to an e-mail for transmission to another mobile phone.

In such a mobile phone with a camera, it is contemplated that usability of the mobile phone can be further improved if an image editing operation can be performed such as scaling (that is, a change in magnification) and move of a captured image.

In conventional terminals, however, individual buttons are provided independently to be spaced from one another, so that it is difficult, for example, to operate the terminal smoothly while it is held by a hand, presenting a problem that its operability is very poor when a game or the like is played.

In addition, some are in the form in which a command is input by inclining a stick-like member slightly protruding from a surface of a housing in upward, downward, leftward, and rightward directions. However, the stick-like member causes an entry which does not necessarily reflect an intention of a user accurately, for example, although the user manipulates it with an intention of moving a cursor in the upward direction, it is moved actually in an up-right direction, resulting in a problem that considerable skill is needed to be able to perform subtle operations accurately.

Furthermore, in a case of inputting the aforementioned image editing operation in a mobile phone, a scale-up button and a scale-down button for an image, and two rotation buttons (right rotation and left rotation) are needed in addition to move buttons in four directions of upward, downward, rightward and leftward, causing a problem that many buttons are required for operations to result in poor usability.

Moreover, a problem is presented that rotation operations of an image by the buttons are not intuitive and cause difficulty in performing fine adjustments of angles to lead to poor usability.

DISCLOSURE OF THE INVENTION

The present invention has been made in view of such circumstances, and intends to allow entries of various commands more comfortably, accurately, and efficiently in a portable information terminal such as a mobile phone.

An image processing apparatus of the present invention is characterized by having operation means rotatable around a rotation axis and having a rotation body which can be pressed in a direction substantially in parallel with the rotation axis, rotation detection means for detecting rotation of the above-mentioned rotation body, press detection means for detecting press of the above-mentioned rotation body, and display control means for controlling display of an image, and the apparatus is characterized in that the above-mentioned display control means rotates and displays the above-mentioned image in accordance with the rotation of the above-mentioned rotation body detected by the above-mentioned rotation detection means and switches and displays the above-mentioned image in accordance with a result of detection by the above-mentioned press detection means.

The above-mentioned press detection means is characterized in that it can detect press of a plurality of points of the above-mentioned rotation body, and the above-mentioned display control means is characterized by moving and displaying the above-mentioned image corresponding to the position where the above-mentioned press detection means detects the press.

The above-mentioned press detection means can detect press of the above-mentioned rotation axis. The above-mentioned display control means performs predetermined processing on the image when the above-mentioned press detection means detects the press of the above-mentioned rotation axis.

The image processing apparatus is further characterized by having timer means for measuring a time period for which the above-mentioned rotation axis is pressed, and in that the above-mentioned display control means switches the above-mentioned processing on the basis of the time period for which the above-mentioned rotation axis is pressed measured by the above-mentioned timer means when the above-mentioned press detection means detects the press of the above-mentioned rotation axis.

An image processing program according to the present invention is an image processing program executed by a computer which controls an image processing apparatus having operation means rotatable around a rotation axis and having a rotation body which can be pressed in a direction substantially in parallel with the rotation axis, rotation detection means for detecting rotation of the above-mentioned rotation body, press detection means for detecting press of the above-mentioned rotation body, and display control means for controlling display of an image, the above-mentioned image processing program is characterized by including the steps of rotating and displaying the above-mentioned image in accordance with rotation of the above-mentioned rotation body detected by the above-mentioned rotation detection means, and switching and displaying the above-mentioned image in accordance with a result of the detection by the above-mentioned press detection means.

An image processing method according to the present invention is an image processing method performed by a image processing apparatus having operation means rotatable around a rotation axis and having a rotation body which can be pressed in a direction substantially in parallel with the rotation axis, rotation detection means for detecting rotation of the above-mentioned rotation body, press detection means for detecting press of the above-mentioned rotation body, and display control means for controlling display of an image, the above-mentioned image processing method is characterized by including the steps of rotating and displaying the above-mentioned image in accordance with the rotation of the above-mentioned rotation body detected by the above-mentioned rotation detection means, and switching and displaying the above-mentioned image in accordance with a result of the detection by the above-mentioned press detection means.

In the image processing apparatus, the image processing program, and the image processing method of the present invention, rotation of the rotation body substantially in a disklike shape is detected, press in a direction substantially in parallel with the rotation axis of the rotation body is detected, and display of an image is controlled. In addition, the image is rotated and displayed in accordance with the rotation of the rotation body, and the image is switched and displayed in accordance with a press detection result.

BRIEF DESCRIPTION OF THE DRAWINGS

FIG. 29 is a schematic diagram for use in description of frame composition.

BEST MODES FOR CARRYING OUT THE INVENTION

First Embodiment

Figure 1:
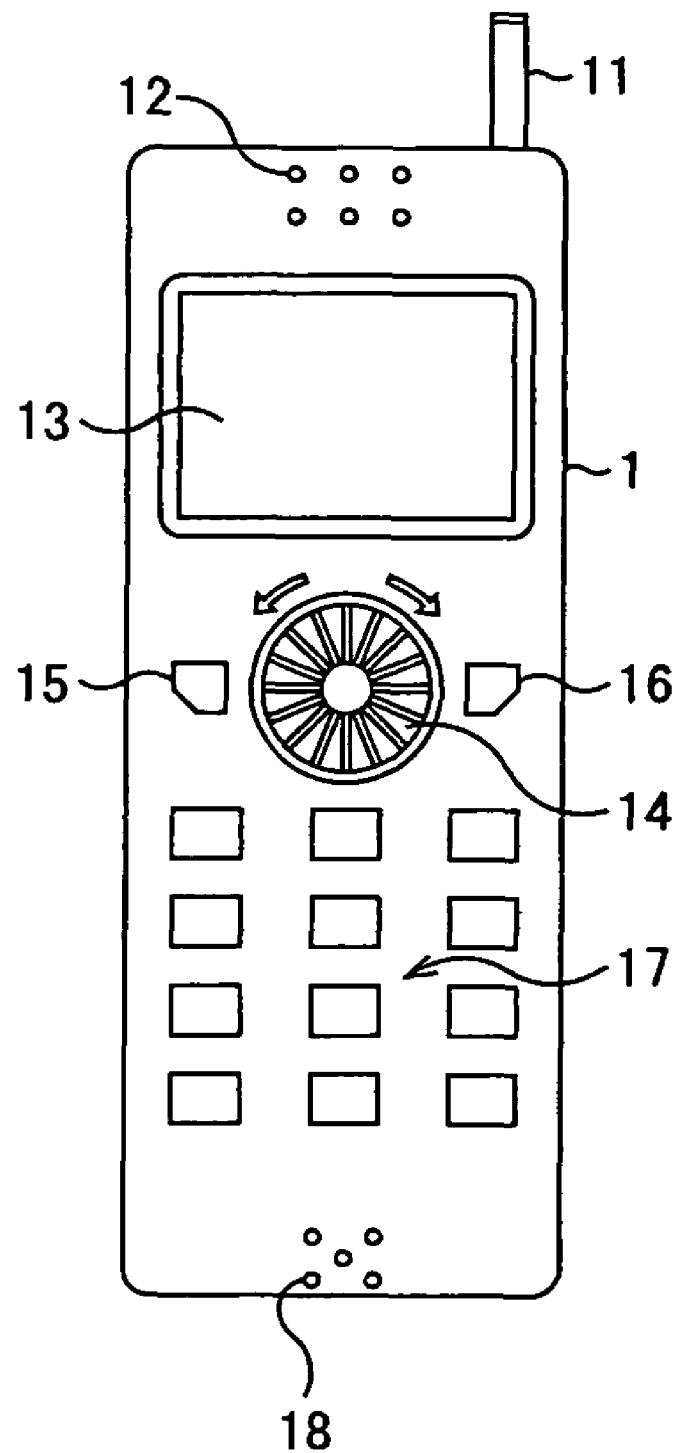
FIG. 1 is a front view showing a structure of an external appearance of a mobile phone to which the present invention is applied.

FIG. 1 is a diagram showing a configuration example of an external appearance of a mobile phone 1 to which the present invention is applied.

A rotation input section 14 generally in a disklike shape is provided substantially at the center of the mobile phone 1. The rotation input section 14 is formed rotatably in a clockwise direction or a counterclockwise direction about a rotation axis perpendicular to the sheet substantially at the center as shown by outline arrows. A user can operate the rotation input section 14, a call button 15 and a power button provided on the left and right of the rotation input section 14, and a numerical keypad 17 provided thereunder to input various commands.

In the mobile phone 1 shown in FIG. 1, the user can rotate the rotation input section 14 or press a predetermined position of a top surface (a plane) of the rotation input section 14 toward an inner direction of the mobile phone 1, for example to play a predetermined game or use a map while seeing a display section 13 formed, for example, of an LCD (Liquid Crystal Display).

A speaker 12 and a microphone 18 are provided near a top end and near a bottom end of a front face of the mobile phone 1, respectively, which the user utilizes at the time of making a call. In addition, an antenna 11 is provided at a top end of the mobile phone 1 in the state in which it protrudes from a housing.

It should be noted that the mobile phone 1 is formed such that a first housing provided with the display section 13 and a second housing provided with the rotation input section 14 and the numerical keypad 17 are foldable through a hinge, in addition to a so-called straight type shown in FIG. 1.

FIGS. 2 to 5 show an example of the structure of the rotation input section 14.

Figure 2:
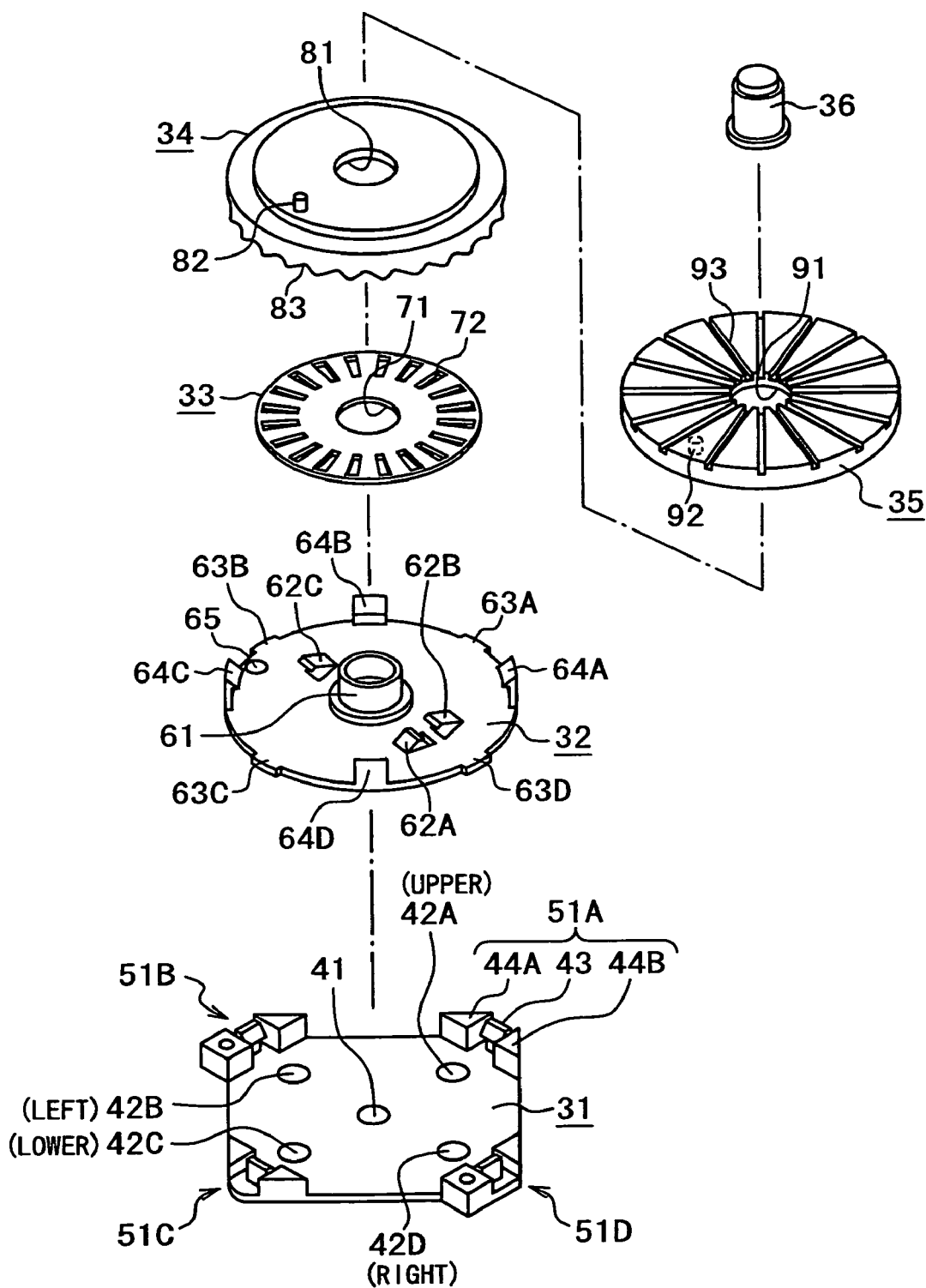
FIG. 2 is an exploded view showing a structure of a rotation input section in FIG. 1.

As shown in FIG. 2, the rotation input section 14 is basically formed of a base 31, a holder 32, a scale 33, a dial body 34, an operation dial 35, and a central button member 36.

The base 31 is made, for example, from an insulating resin and formed as a substantially rectangular plate shape. A central button 41 is provided at the center of an upper surface of the base 31, and thereabout, peripheral buttons 42A to 42D are provided at regular intervals. The base 31 is disposed such that a line connecting the peripheral button 42A with the peripheral button 42C is substantially in parallel with a central line in the up-and-down direction of the mobile phone 1 in FIG. 1. Thus, the peripheral button 42A is positioned on the upper side of the mobile phone 1 shown in FIG. 1, while the peripheral button 42B is positioned on the left side. In addition, the peripheral button 42C is positioned on the lower side of the mobile phone 1 shown in FIG. 1, while the peripheral button 42D is positioned on the right side (hereinafter the peripheral button 42A is referred to as an upper button 42A, the peripheral button 42B as a left button 42B, the peripheral button 42C as a lower button 42C, and the peripheral button 42D as a right button 42D, respectively, as appropriate). Each of the central button 41 and the peripheral buttons 42A to 42D is formed of a push switch.

An upper movement limiting member 43 is provided with a nail extending toward the center of the base 31. The nail limits an upward movement of the holder 32. Rotation limiting members 44A and 44B are provided on both sides of the upper movement limiting member 43 slightly spaced therefrom. The rotation limiting members 44A and 44B limit rotation of the holder 32. These upper movement limiting member 43, and the rotation limiting members 44A and 44B constitute a holder limiting section 51A. Similarly, holder limiting sections 51B, 51C, and 51D are disposed in other three corners.

The holder 32 is formed in the shape of an insulating disk having a hole at the center. A dial holding cylinder 61 for rotatably holding the dial body 34 and the like is formed in the central portion of the upper surface to protrude from the periphery of the hole toward the upper surface (upward in FIG. 2). Thus, a central axis of the hole of the dial holding cylinder 61 serves as an rotational axis of the dial body 34 and the like.

In addition, brushes 62A, 62B, and 62C which are elastic materials having conductivity are provided on the upper surface of the holder 32. The rotation amount and the rotation direction of the rotation input section 14 (the operation dial 35) are detected by detecting a change in the electrical connection state between the brushes 62A, 62B, and 62C with the scale 33 disposed on the holder 32.

Specific description is made. Positions in a diameter direction where the brushes 62A and 62B are disposed correspond to positions where they come into contact with slits 72 of the scale 33 when the scale 33 is disposed on the holder 32. When the rotation input section 14 is rotationally operated and the scale 33 is rotated in association therewith, contact (at the position between two of the slits 72) and non-contact (at the position of one of the slits 72) are repeated between the brushes 62A and 62B and the scale 33.

On the other hand, the brush (earth brush) 62C is provided at the position where it is always in contact with the scale 33 when the scale 33 is disposed on the holder 32. In addition, the brush (earth brush) 62C repeats conduction and non-conduction to the brush 62A or 62B through the scale 33 when the scale 33 is rotated.

Thus, in the rotation input section 14, the rotation amount of the rotation input section 14 can be calculated on the basis of the number of pulses generated in accordance with a change in the conductive state between the brush 62A or 62B and the brush 62C (repeated contact and non-contact between the brush 62A or 62B and the scale 33).

In addition, the rotation direction of the rotation input section 14 can be detected by providing the brush 62A and the brush 62B with a slight distance between them in the circumferential direction. Specifically, when the rotation input section 14 is rotated in the counterclockwise direction in the state in FIG. 1, a rising edge (or a falling edge) of the pulse generated by the brush 62A coming into contact with the scale 33 is detected at an earlier point in time than the rising edge (or the falling edge) of the pulse generated by the brush 62B coming into contact with the scale 33 corresponding to the distance between them.

In contrast, when the rotation input section 14 is rotated in the clockwise direction, the rising edge (or the falling edge) of the pulse generated by the brush 62B coming into contact with the scale 33 is detected at an earlier point in time than the rising edge (or the falling edge) of the pulse generated by the brush 62A coming in contact with the scale 33.

Thus, the rotation direction of the rotation input section 14 is detected on the basis of the timing difference between the rising edges (or the falling edges) of the pulses thus found.

Limited members 63A to 63D are formed at periphery portions of the holder 32 corresponding to the holder limiting sections 51A to 51D. When the holder 32 is disposed on the base 31, displacements (rotation and separation) of the limited members 63A to 63D are limited by the holder limiting sections 51A to 51D, respectively.

Figure 3:
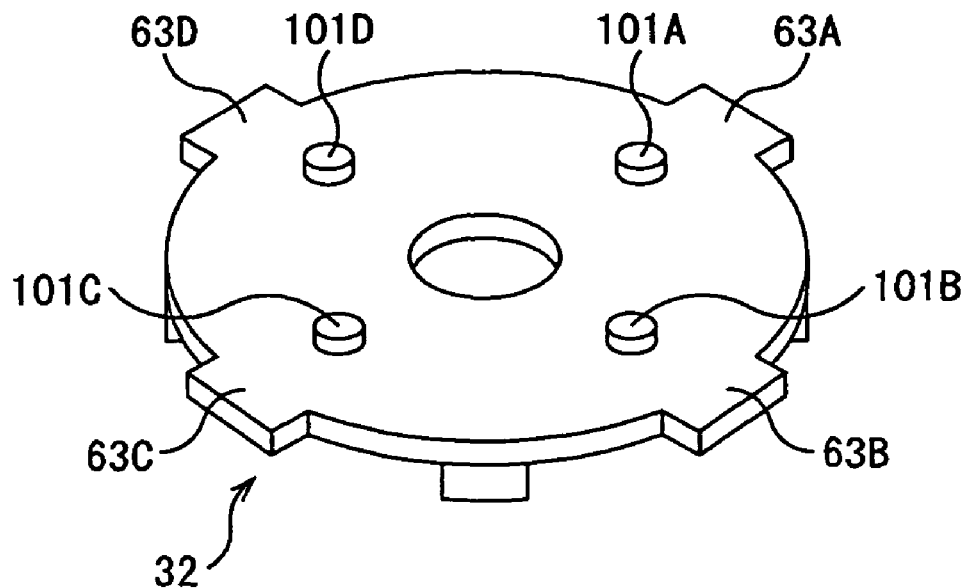
FIG. 3 is a perspective view showing a structure of a back face of a holder in FIG. 2.

Button pressing protrusions 101A to 101D are provided at positions corresponding to the peripheral buttons 42A to 42D on the back of the holder 32 as shown in FIG. 3. Thus, when the upper side of the rotation input section 14 is pressed in a direction perpendicular to the sheet in the mobile phone 1 shown in FIG. 1, the button pressing protrusion 101A presses the upper button 42A (the peripheral button 42A), and when the left side of the rotation input section 14 is pressed, the button pressing protrusion 101B presses the left button 42B (the peripheral button 42B). Similarly, when the lower side of the rotation input section 14 is pressed, the button pressing protrusion 101C presses the lower button 42C (the peripheral button 42C), and when the right side of the rotation input section 14 is pressed, the button pressing protrusion 101D presses the right button 42D (the peripheral button 42D).

Dial body holding members 64A to 64D are formed at periphery portions of the holder 32 such that they are spaced by a predetermined distance and protrude toward the upper surface (upward in FIG. 2). The dial body holding members 64A to 64D are provided at the top ends thereof with nails extending toward the center of the holder 32 such that the nails limit separation of the dial body 34.

In addition, a click feel protrusion 65 is provided on the upper surface of the holder 32. When the rotation input section 14 is rotated, a click feel is produced for the user by the click feel protrusion 65 and a click feel uneven portion 83 of the dial body 34.

A hole 71 through which the dial holding cylinder 61 is inserted is formed at a central portion of the scale 33, and thereabout, a number of the slits 72 are formed radially with a predetermined angular pitch near the edge of the scale 33 as described above. The scale 33 is fixed to a back face of the dial body 34 and disposed on the holder 32 as shown in FIG. 4.

A hole 81 is formed through which the dial holding cylinder 61 is inserted at the center of the dial body 34. In addition, a transmission protrusion 82 is formed on the upper surface of the dial body 34. The transmission protrusion 82 is fitted into a transmission depression 92 formed in the back of the operation dial 35 to transmit the rotation force of the operation dial 35 to the dial body 34.

Figure 4:
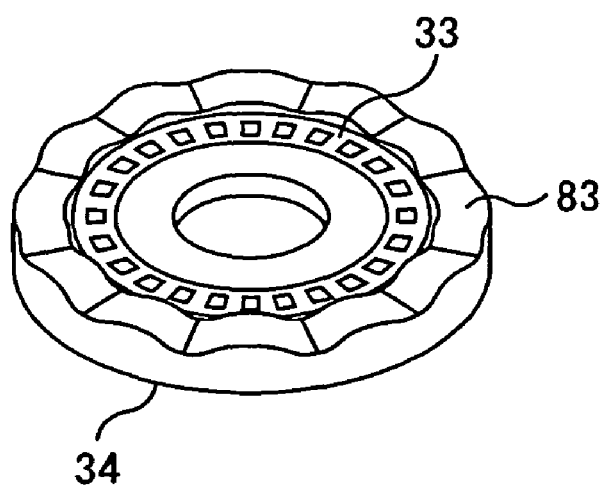
FIG. 4 is a perspective view showing a structure of a back face of a dial body in FIG. 2.

In addition, the wave-shaped click feel uneven potion 83 as shown in FIG. 4 is formed at a periphery portion on a back face of the dial body 34 along the overall length, and the click feel protrusion 65 is fitted with play into a depression thereof as described above.

A hole 91 through which the central button member 36 is inserted is formed at the center of the operation dial 35. In addition, a transmission depression 92 into which the transmission protrusion 82 of the dial body 34 is fitted is formed in a back face of the operation dial 35. A number of grooves 93 extending radially are formed to cause appropriate friction at the time of rotation operation to improve operability.

Figure 5:
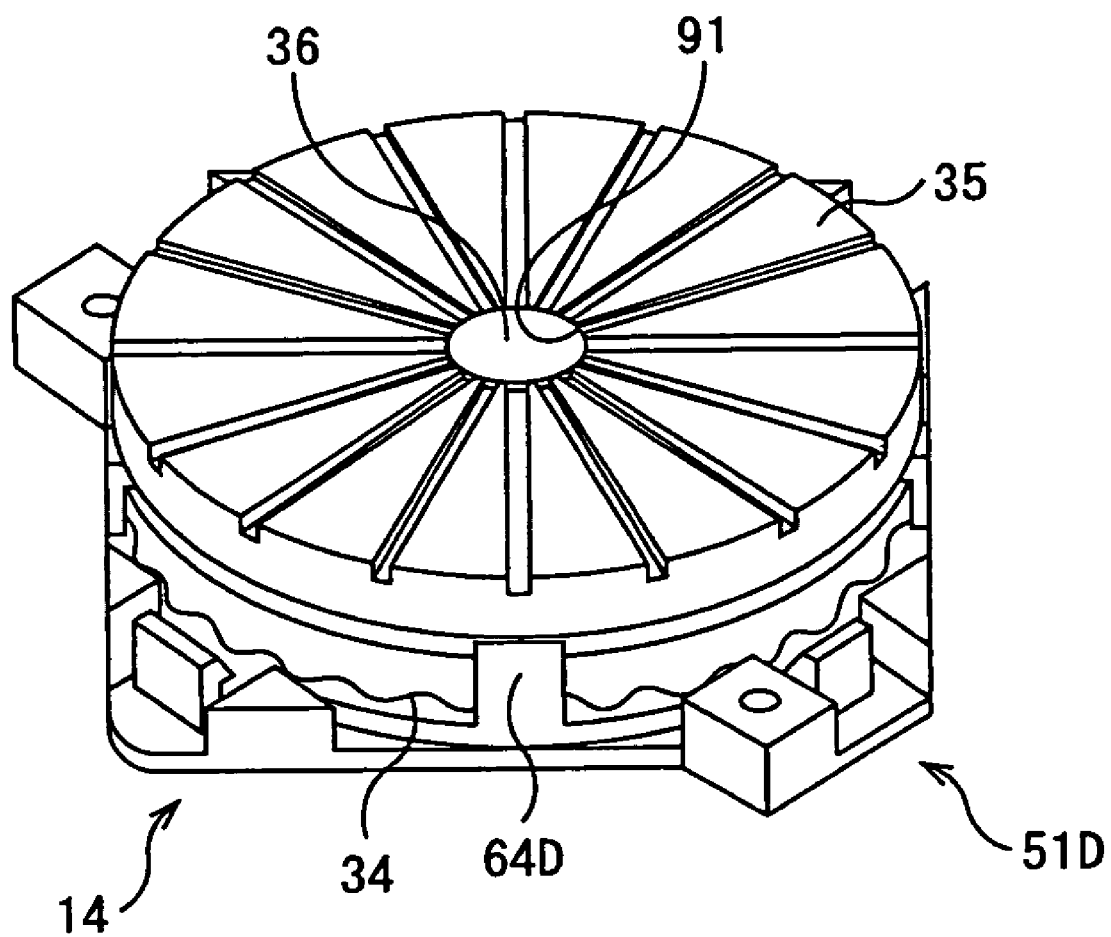
FIG. 5 is a perspective view showing the structure of the rotation input section in FIG. 1.

The respective members described above constitute the rotation input section 14 as shown in FIG. 5 which is incorporated in the mobile phone 1 in a state in which the upper surface of the operation dial 35 is exposed.

In the rotation input section 14 shown in FIG. 5, the user can press an upper-right portion (the upper side in FIG. 1) of the operation dial 35, for example to move a cursor displayed on the display section 13 upward, and also, press an upper-left portion (the left side in FIG. 1) of the operation dial 35 to move the cursor displayed on the display section 13 to the left.

Specifically, the peripheral button 42A is placed in the portion of the base 31 corresponding to the upper-right portion of the rotation input section 14 shown in FIG. 5, and the peripheral button 42B is placed in the portion of the base 31 corresponding to the upper-left portion. When those buttons are pressed, the cursor is moved as described above in association with the pressing.

Figure 6:
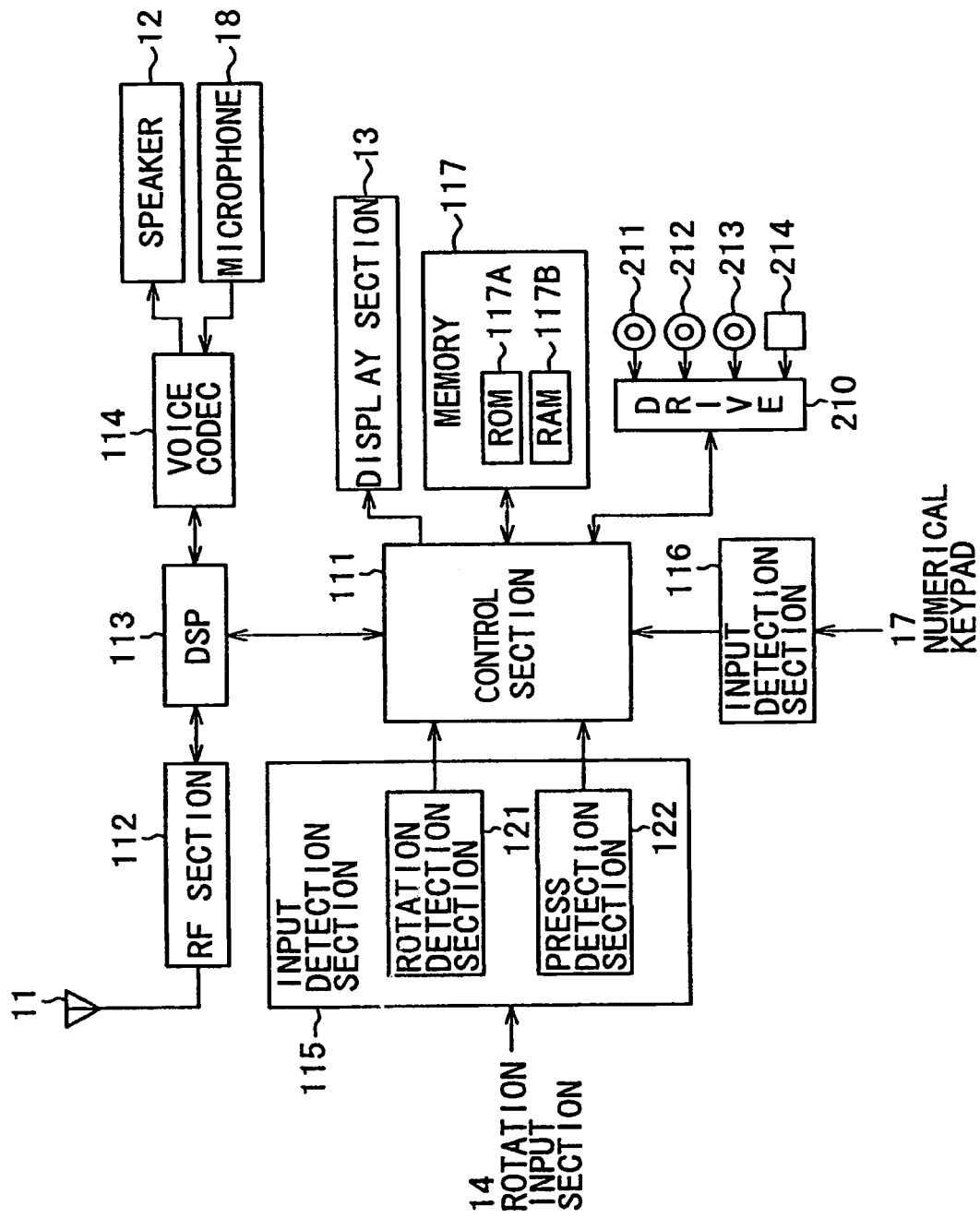
FIG. 6 is a block diagram showing an inner configuration example of the mobile phone in FIG. 1.

FIG. 6 is a block diagram showing an inner configuration example of the mobile phone 1 to which the present invention is applied.

A control section 111 deploys a control program stored in a ROM (Read Only Memory) 117A of a memory 117 in a RAM (Random Access Memory) 117B, and controls the overall operations of the mobile phone 1 in accordance with the deployed program.

For example, the control section 111 starts a predetermined program based on an instruction from a user and displays a game image or a map on the display section 13. Then, when a rotation detection section 121 of an input detection section 115 detects an entry to the rotation input section 14 (when the rotation input section 14 is rotated), the control section 111 controls a DSP (Digital Signal Processor) to calculate the rotation amount, the rotation direction or the like of the rotation input section 14 and controls the display of the image displayed on the display section 13. The processing of the control section 111 for controlling the display on the display section 13 in response to an entry to the rotation input section 14 is later described in detail.

An RF (Radio Frequency) section 112 transmits/receives radio waves to and from a base station through the antenna 11. For example, in a voice call mode, the RF section 112 amplitudes an RF signal received by the antenna 11 and performs predetermined processing such as frequency conversion processing and analog/digital conversion processing, and outputs resulting voice data to a DSP 113. In addition, when voice data is supplied from the DSP 113, the RF section 112 performs predetermined processing such as digital/analog conversion processing and frequency conversion processing, and transmits a resulting voice signal from the antenna 11.

The DSP 113 performs, for example despread spectrum processing on voice data supplied from the RF section 112, and outputs the resulting data to a voice codec 114. In addition, the DSP 113 performs spread spectrum processing on voice data supplied from the voice codec 114 and outputs the resulting data to the RF section 112. Also, the DSP 113 performs processing such as the calculation of a rotation amount for displaying an image, the calculation of a rotation direction, and the calculation of a display range in accordance with control by the control section 111.

The voice codec 114 converts voice of a user collected by the microphone 18 into voice data and outputs it to the DSP 113. In addition, the voice codec 114 converts voice data supplied from the DSP 113 to an analog voice signal and outputs the corresponding voice signal from the speaker 12.

The rotation detection section 121 of the input detection section 115 is connected to the brushes 62A, 62B, and 62C shown in FIG. 2. The rotation detection section 121 monitors the state of contact or non-contact between the brushes 62A and 62B and the scale 33 and outputs pulses in correspondence with a change in the contact state to the control section 111 as described above.

A press detection section 122 of the input detection section 115 is connected to the central button 41 and to the peripheral switches 42A to 42D shown in FIG. 2. When these buttons are pressed (when the upper surface of the rotation input section 14 is pressed in the inner direction), the press detection section 122 detects the pressing and outputs an associated signal to the control section 111.

The control section 111 is connected to a drive 210 as required. A magnetic disk 211, an optical disc 212, a magneto-optical disc 213, or a semiconductor memory 214 and the like are loaded in the drive 210 as appropriate, and a computer program read therefrom is installed on the control section 111 as required.

The input detection section 116 detects an entry from the call button 15, the power button 16, and another button such as the numeric keypad 17 provided for the mobile phone 1, and outputs the associated signal to the control section 111.

Next, description is made for the operations of the mobile phone 1 having the configuration described above.

First, description is made for processing of the control section 111 for controlling display of an image (a plane image) in response to an entry to the rotation input section 14 in a game in which a main character (hereinafter called avatar as appropriate) is moved in a two-dimensional plane with reference to flow charts of FIGS. 7 and 8.

Figure 9:
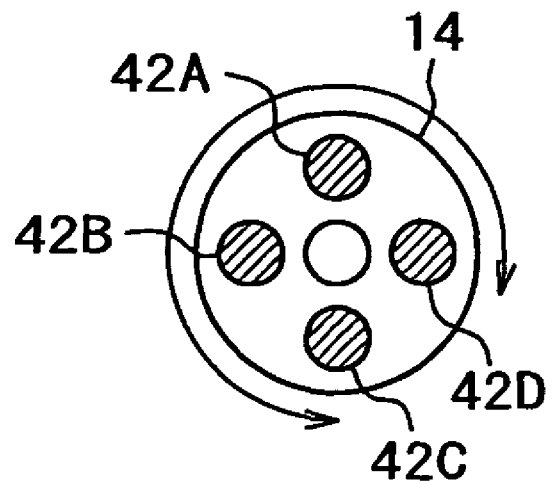
FIG. 9A is a diagram showing input to the rotation input section.
FIG. 9B is a diagram showing an example of movement of an avatar performed in association with the input in FIG. 9A.
Figure 9:
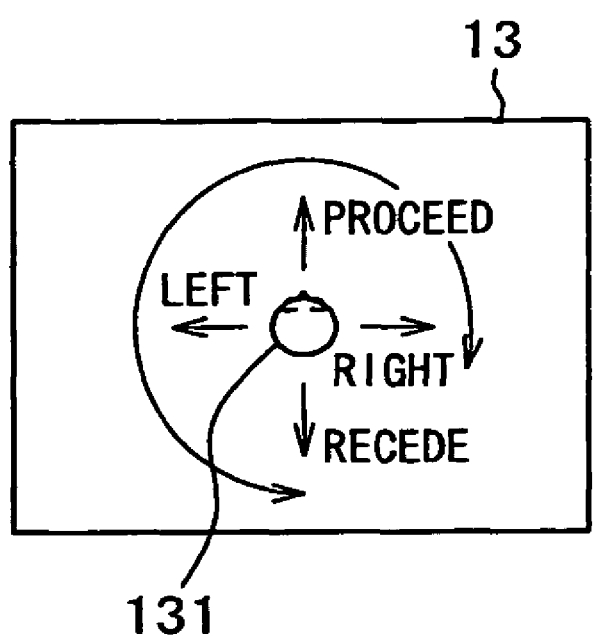

FIGS. 9A and 9B are diagrams showing the operation on the rotation input section 14 and a corresponding example of movement of an avatar 131 displayed on the display section. In FIG. 9B, the upper side corresponds to the front side of the avatar 131.

For example, as shown in FIG. 9A, when the upper side of the rotation input section 14 is pressed and the press detection section 122 detects the pressing of the upper button 42A, the control section 111 causes the avatar 131 displayed on the display section 13 to proceed in the plane (a background image is scrolled downward (switched)) as shown in FIG. 9B. Similarly, as shown in FIG. 9A, when the rotation input section 14 is pressed and the press of the left button 42B, the lower button 42C, or the right button 42D is detected, the control section 111 causes the avatar 131 to move in the left direction, the lower direction, or the right direction in the plane as shown in FIG. 9B (the background is scrolled in the right direction, the upper direction, or the left direction).

In addition, when the rotation input section 14 is rotationally operated in the clockwise direction or the counterclockwise direction as shown in FIG. 9A, and the rotation detection section 121 detects it, the control section 111 causes the front of the avatar 131 to be rotated in the clockwise direction or the counterclockwise direction in accordance with the rotation amount as shown in FIG. 9B. For example, when the front of the avatar 131 is set to face in the upper direction of the screen, the background image is rotated in the counterclockwise direction or the clockwise direction by a predetermined angle about the position of the avatar 131 (the center of the display section 13).

Figure 7:
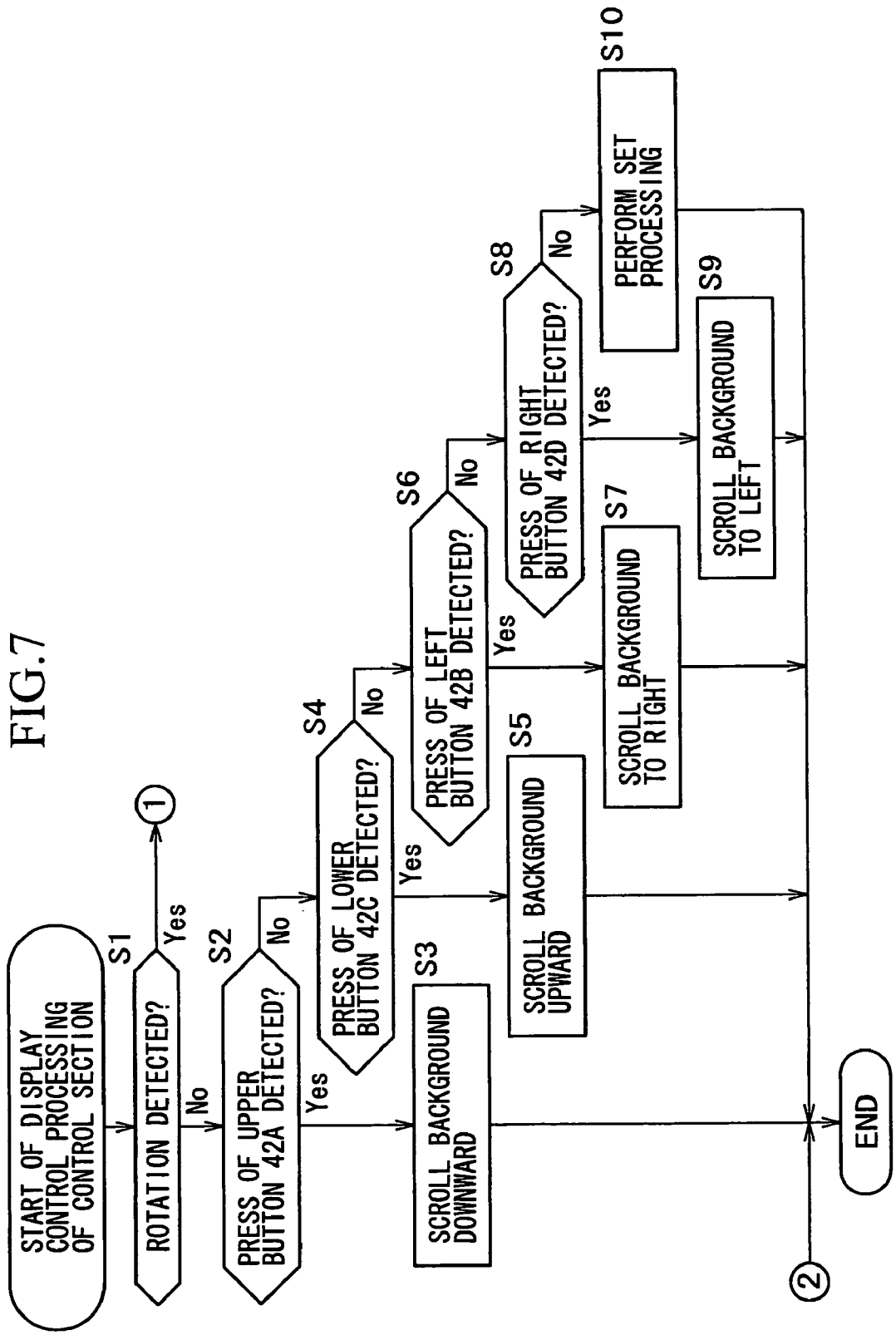
FIG. 7 is a flow chart for explaining display processing of the mobile phone in FIG. 1.

When the rotation input section 14 is operated, at step S1 in FIG. 7, the control section 111 determines whether or not the rotation detection section 121 detects rotation. Specifically, the control section 111 determines whether or not rotation of the orientation of the avatar 131 is instructed, and when it determines that rotation is not instructed, it proceeds to step S2.

At step S2, the control section 111 determines whether or not the press detection section 122 detects press of the upper button 42A. In other words, the control section determines whether or not proceeding of the avatar 131 is instructed, and when it determines that proceeding is instructed, it proceeds to step S3 where it causes the avatar 131 to proceed in the plane (the background displayed on the display section 13 is scrolled downward).

Figure 10:
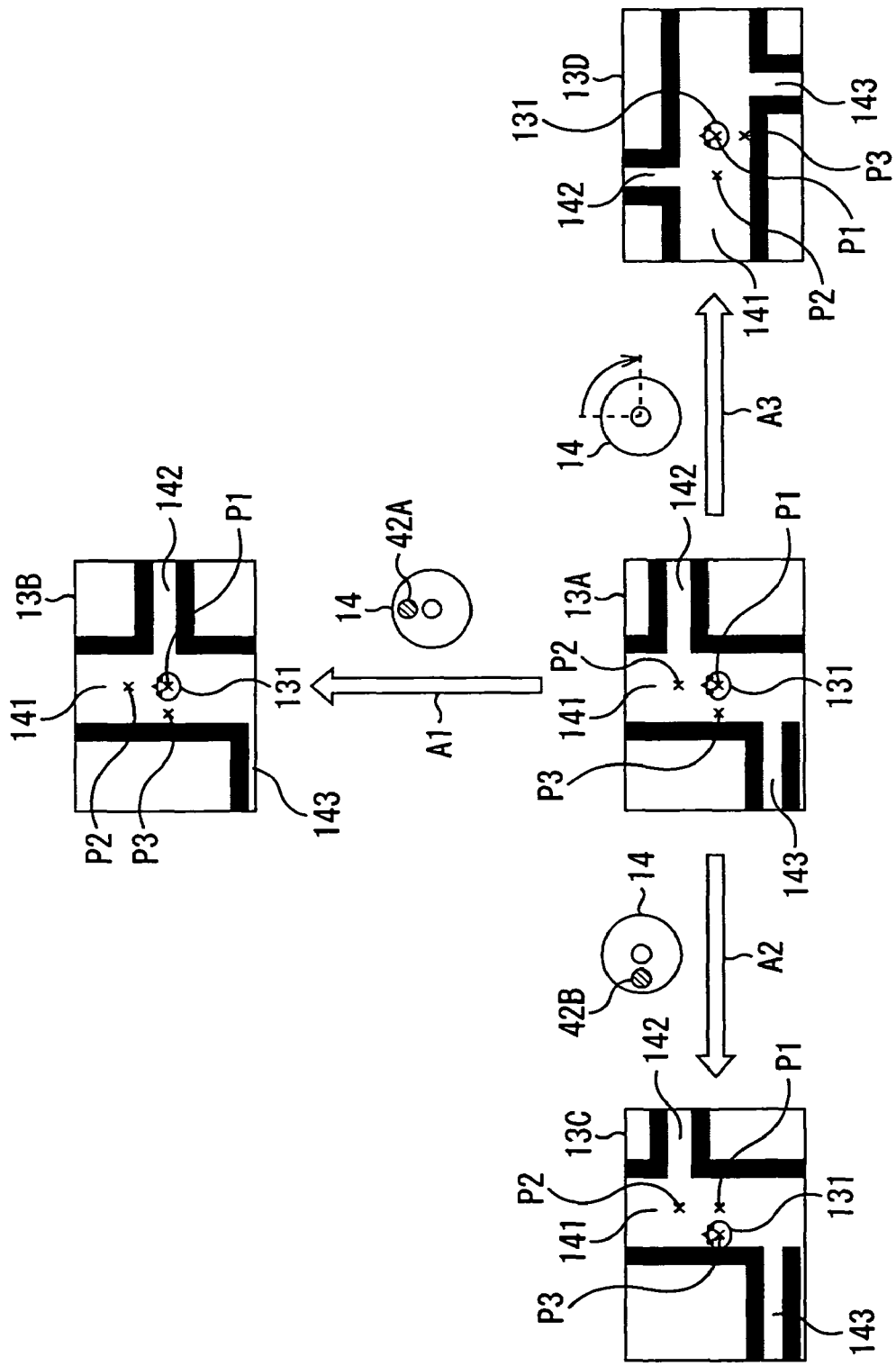
FIG. 10 is a diagram showing an example of switching of screens displayed in a display section.

A screen shown in a display section 13A in FIG. 10 is a view showing a display example of the display section 13. A street 141 is displayed in the up-and-down direction as a background image. A street 142 and a street 143 are displayed horizontally in an upper-right portion and a lower-left portion of the display section 13A. In addition, the avatar 131 is displayed at a central position P1 of the display section 13A.

Thus, in a state of the screen shown in the display section 13A of FIG. 10, when the upper button 42A is pressed, the display becomes that shown as a display section 13B indicated by an outline arrow A1. Specifically, the image is switched such that the avatar 131 is moved to a position P2 above the position P1 by a predetermined distance and the position P2 corresponds to the center of the display section 13 (the background is scrolled downward from the state of the display of the display section 13A).

Returning to the description of FIG. 7, after the background is switched at step S3, the processing is ended. When the rotation input section 14 is again operated, similar processing is performed.

On the other hand, when the control section 111 determines that the press detection section 122 detects no press of the upper button 42A at step S2, it proceeds to step S4 where it determines whether or not press of the lower button 42C is detected. In other words, the control section 111 determines whether or not receding of the avatar 131 is instructed.

When the control section 111 determines that receding of the avatar 131 is instructed at step S4, it proceeds to step S5 where it causes the avatar 131 to recede in the plane (the background displayed on the display section 13 is scrolled upward).

Thus, for example, when the lower button 42C is pressed in the state of the screen shown in the display section 13B of FIG. 10, the display becomes that shown as the display section 13A. Specifically, the image is scrolled upward such that the position P1 corresponds to the center of the image (the position of the avatar 131).

When the control section 111 determines that the press detection section 122 detects no press of the lower button 42C at step S4, it proceeds to step S6 where it determines whether or not press of the left button 42B is detected. In other words, the control section 111 determines whether or not movement of the avatar 131 to the left is instructed.

When the control section 111 determines that movement of the avatar 131 to the left is instructed at step S6, it proceeds to step S7 where it causes the avatar 131 to move to the left (the background displayed in the display section 13 is scrolled to the right).

For example, when the left button 42B is pressed in a state of the screen shown as the display section 13A in FIG. 10, the display becomes that shown in as a display section 13C indicated by an outline arrow A2 by processing at step S7.

Specifically, the background is scrolled to the right such that the avatar 131 is moved to a position P3 on the left of the position P1 and the position P3 corresponds to the center of the screen. Thus, the street 142 is displayed with a smaller lateral length and the street 143 is displayed with a larger lateral length corresponding to the movement of the avatar 131 as compared with the screen shown as the display section 13A.

On the other hand, when the control section 111 determines that the press detection section 122 detects no press of the left button 42B at step S6, it proceeds to step S8 where it determines whether or not press of the right button 42D is detected. In other words, the control section 111 determines whether or not movement of the avatar 131 to the right is instructed.

When the control section 111 determines that movement of the avatar 131 to the right is instructed at step S8, it proceeds to step S9 where it causes the avatar 131 to move to the right (the background displayed in the display section 13 is scrolled to the left).

For example, when the right button 42D is pressed in a state in which the screen of the display section 13C in FIG. 10 is displayed, the background is scrolled to the left such that the avatar 131 stands at the central position P1 of the screen, and the display becomes that shown as the display section 13A.

On the other hand, when the control section 111 determines that press of the right button 42D is not detected at step S8, it recognizes that the central button 41 is pressed, and it proceeds to processing at step S10. At step S10, the control section 111 performs processing (an action) previously set to be performed when the central button 41 is pressed.

For example, when talking to a partner in front of the avatar 131 is set as the action when the central button 41 is pressed, the control section 111 causes the avatar to perform the action of talking to the partner in front at step S10. In this manner, various actions can be set in association with the central button 41, for example, causing the avatar 131 to jump, or attacking a partner in front.

Figure 8:
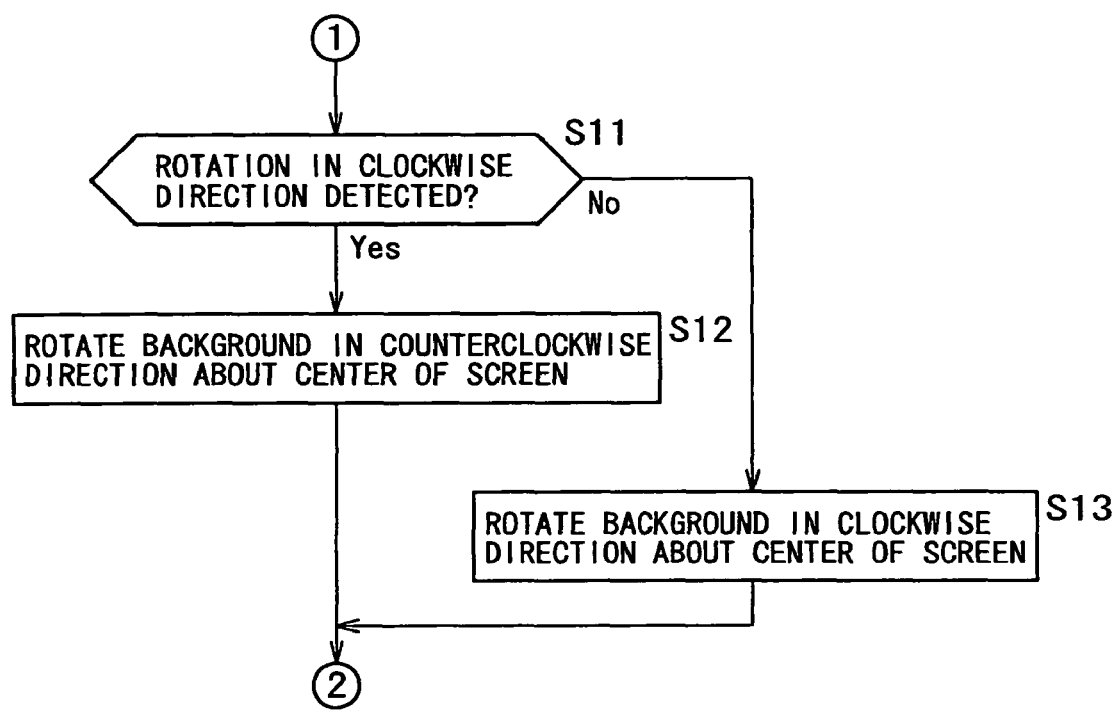
FIG. 8 is a flow chart for explaining the display processing of the mobile phone in FIG. 1, subsequent to FIG. 7.

On the other hand, when the control section 111 determines that the rotation detection section 121 detects rotation at step S1, it determines whether or not rotation in the clockwise direction is detected at step S11 in FIG. 8. In other words, the control section 111 determines whether or not rotation of the front of the avatar 131 in the clockwise direction relative to the current front is directed.

As described above, the control section 111 detects the rotation direction on the basis of a timing difference between the rising edges (or the falling edges) of the pulse generated by the brush 62A coming into contact with the scale 33 and the pulse generated by the brush 62B coming into contact with the scale 33.

When the control section 111 determines that rotation in the clockwise direction is detected at step S11, it proceeds to processing at step S12. The control section 111 calculates the rotation amount on the basis of the number of the pulses detected by the rotation detection section 121, and causes the avatar 131 to be rotated in the clockwise direction in accordance with the calculated rotation amount (the background is rotated in the counterclockwise direction relative to the center of the display section 13).

For example, when the rotation input section 14 is rotated 90 degrees in the clockwise direction in the state of the screen shown as the display section 13A in FIG. 10, the screen displayed in the display section 13 becomes that shown as a display section 13D indicated by an outline arrow A3.

Specifically, in the display section 13D, the background is rotated 90 degrees in the counterclockwise direction about the position P1 and is rotated such that the front of the avatar 131 corresponds to the right side of the display section 13A. As a result, the street 141 is displayed as a lateral street in the display section 13D, and the street 142 and the street 143 are displayed as vertical streets.

In this example, the angle of the rotation of the rotation input section 14 and the angle of the rotation of the avatar 131 are set at the same ratio (1:1), but the rotation ratio may be set according to preference, for example, by setting a larger rotation angle of the avatar 131 than an angle of rotation of the rotation input section 14.

On the other hand, when the control section 111 determines that rotation in the clockwise direction is not detected at step S11, it recognizes that rotation in the counterclockwise direction is detected, and it proceeds to processing at step S13. The control section 111 calculates the rotation amount on the basis of the number of the pulses detected by the rotation detection section 121 and causes the avatar 131 to be rotated in the counterclockwise direction in accordance with the calculated rotation amount (the background is rotated in the clockwise direction about the center of the screen).

For example, in a state of the screen shown as the display section 13D in FIG. 10, when the rotation input section 14 is rotated 90 degrees in the counterclockwise direction, the displayed screen becomes that shown as the display section 13A.

Every time an entry to the rotation input section 14 is detected, the aforementioned processing is performed. Thus, the user can input various commands more accurately and efficiently by rotating or pressing only the rotation input section 14 which is the single operation section without operating the plurality of buttons provided with spacing between them. In addition, since the rotation input section 14 is rotated and the screen is rotated in association therewith, operations can be performed with a sense of synchronization with the display of the screen.

While the description above has been made for the case where the avatar 131 displayed within the plane is moved, the aforementioned processing can be applied to a case where display of a map displayed in the display section 13 is switched.

Figure 11:
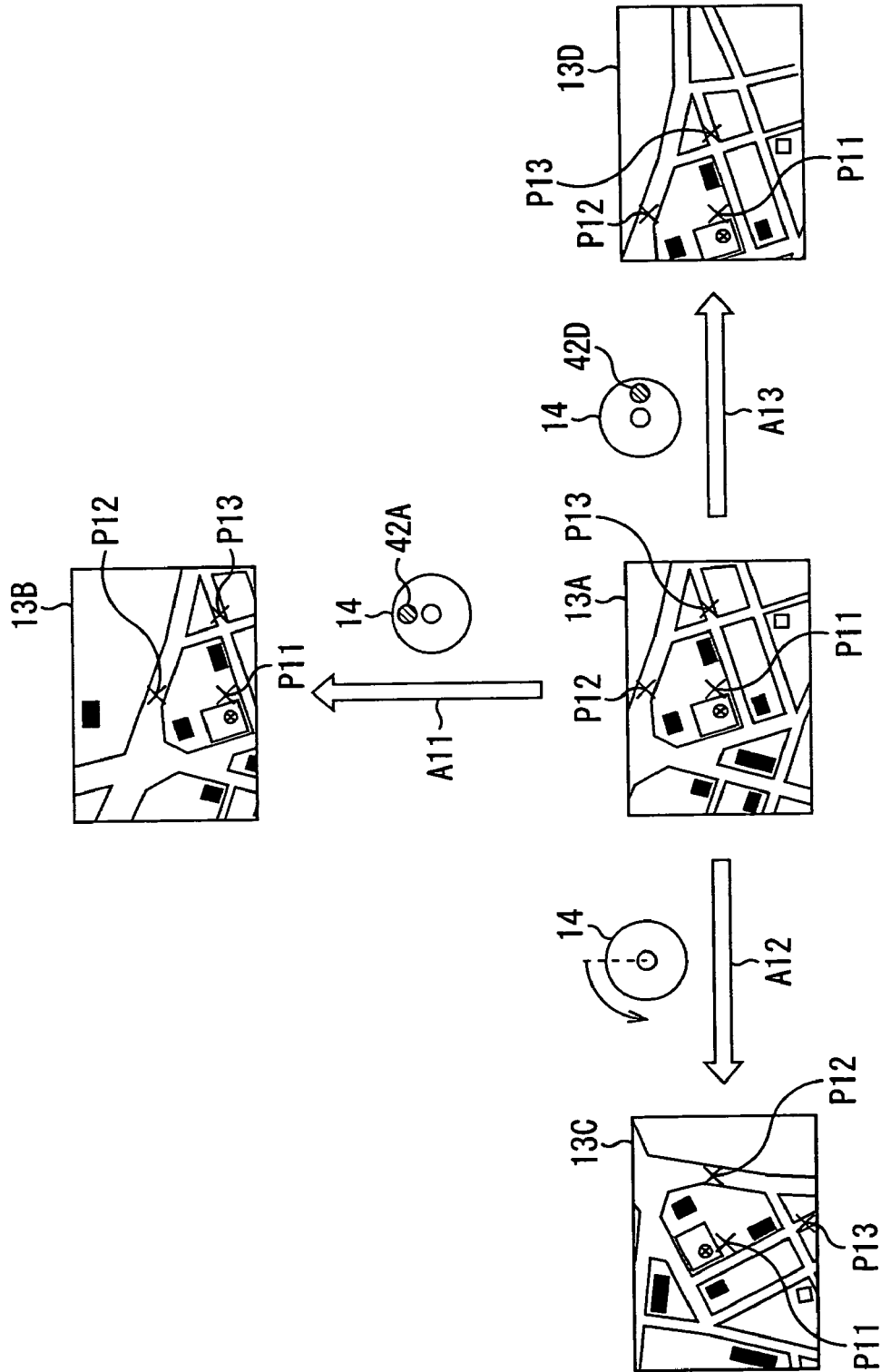
FIG. 11 is a diagram showing another example of switching of screens displayed in the display section.

For example, in a state in which a map is displayed as shown in a display section 13A in FIG. 11 and a position P11 corresponds to the center of the screen, when the upper button 42A of the rotation input section 14 is pressed, the map shown in the display section 13A is scrolled downward such that a position P12 above the position P11 corresponds to the center of the screen. The display becomes that shown as a display section 13B indicated by an outline arrow A11.

Similarly, in the state of display shown in the display section 13A, when the rotation input section 14 is rotated by a predetermined angle in the counterclockwise direction, the display becomes that shown as a display section 13C indicated by an outline arrow A12.

Specifically, the map rotated in the clockwise direction about the position P11 of the display section 13A is displayed such that the left side of the display section 13A corresponds to the upper side of the screen. In the display section 13C, the position P12, which is in an upper portion of the display of the display section 13A, is moved in the right direction of the screen.

In the state of display shown in the display section 13A, when the right button 42D of the rotation input section 14 is pressed, a position P13, which is on the right side in the display of the display section 13A, is scrolled to be displayed corresponding to the center, and the display becomes that shown as a display section 13D indicated by an outline arrow A13.

When the display of the map is switched as described above, for example, the scale of the map can be sequentially switched such that scale-up display or scale-down display of the map is performed every time the central button 41 is operated.

Figure 12:
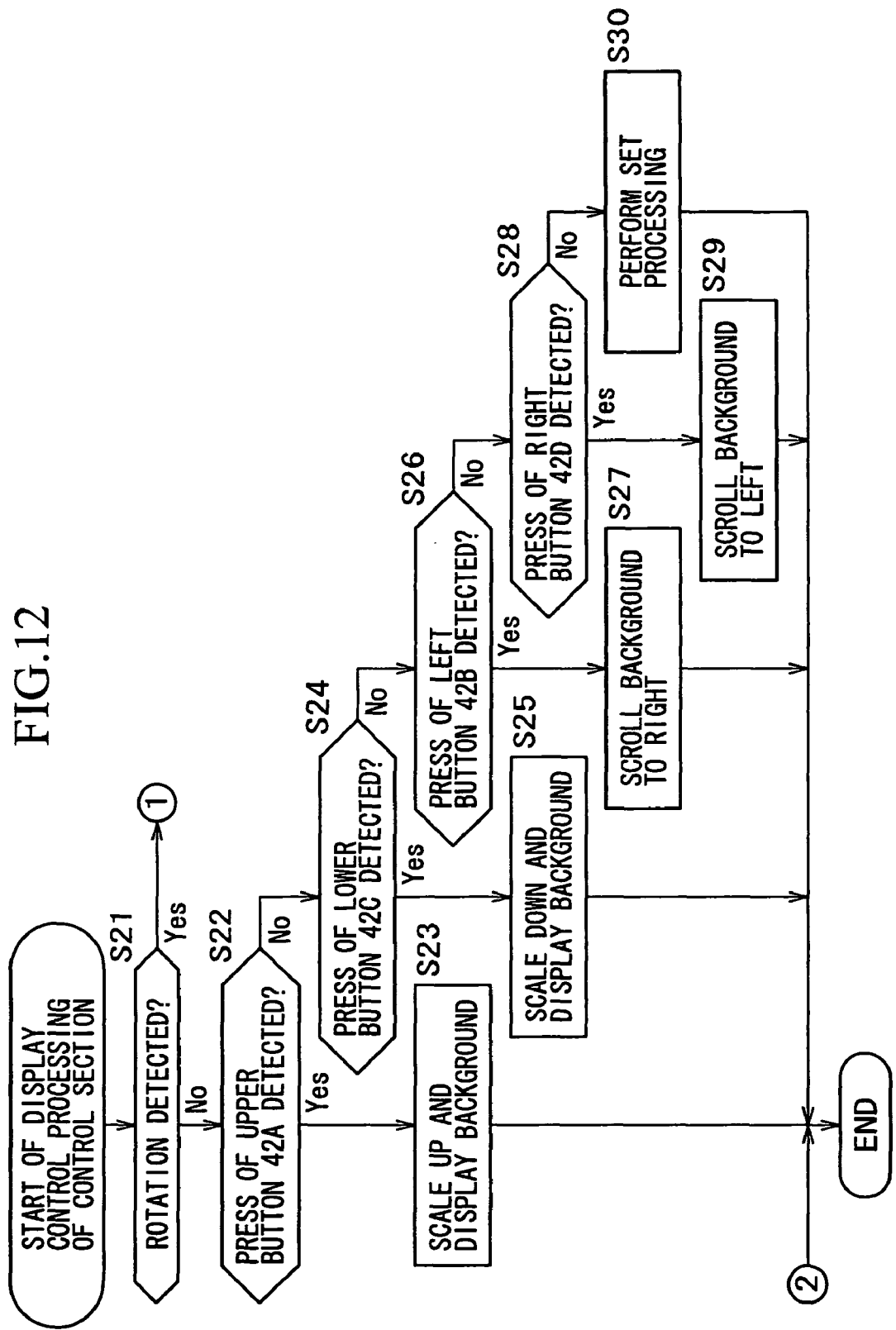
FIG. 12 is a flow chart for explaining another display processing of the mobile phone in FIG. 1.
Figure 13:
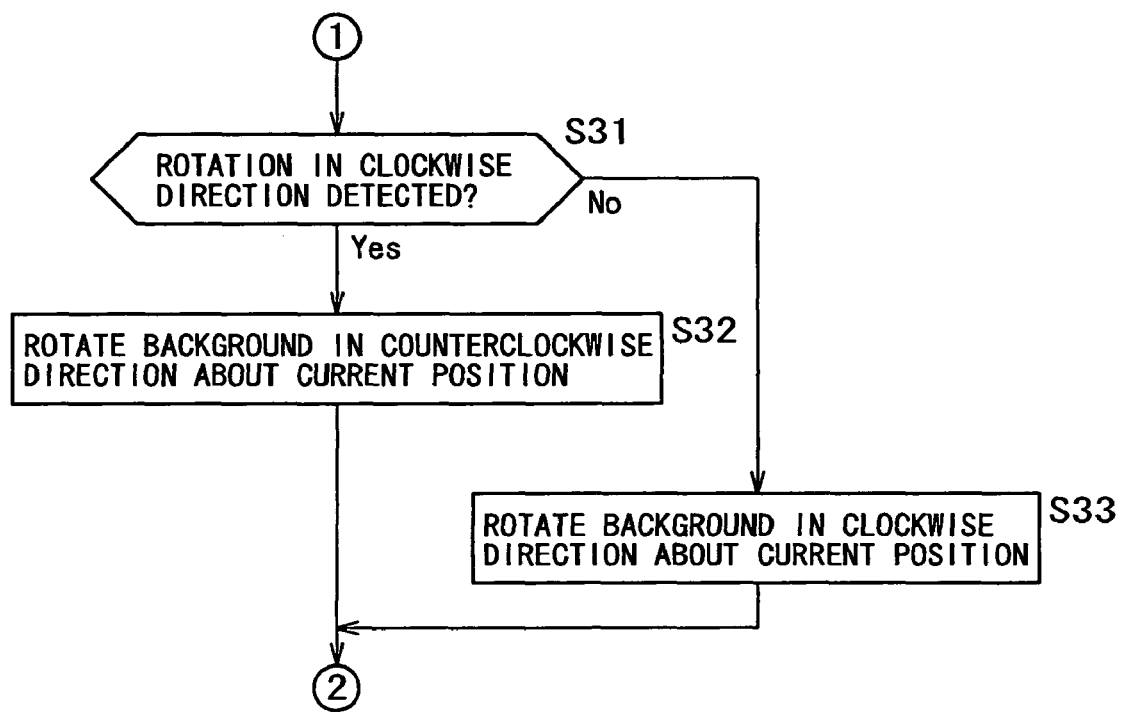
FIG. 13 is a flow chart for explaining the other display processing of the mobile phone in FIG. 1, subsequent to FIG. 12.

While the aforementioned description has been made for the case where the display of the plane image is switched as shown in FIGS. 10 and 11, description is made next for switching of display of a three-dimensional image such as a landscape image in a virtual space and a map image displayed as a bird view with reference to flow charts of FIGS. 12 and 13.

Figure 14:
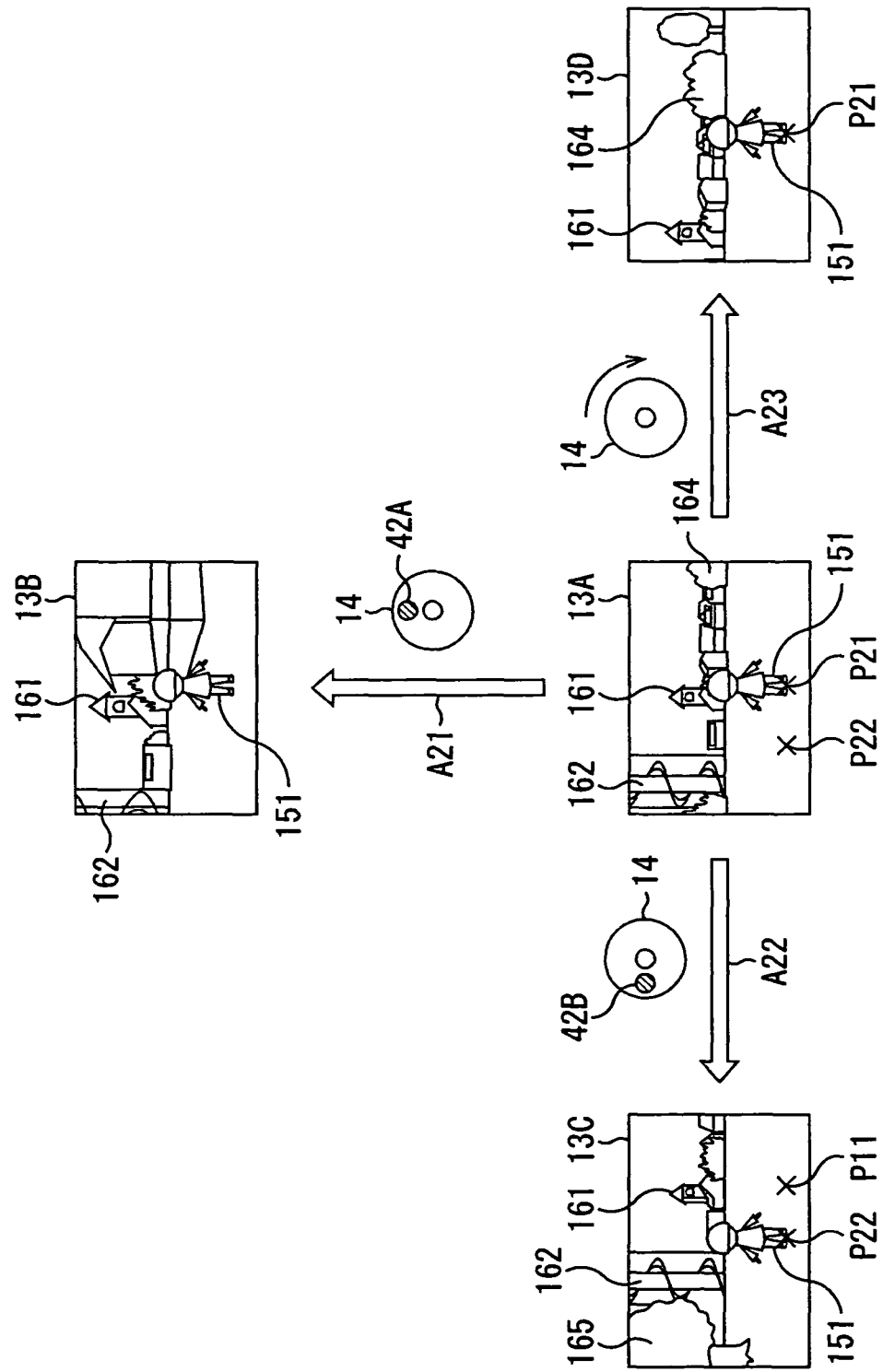
FIG. 14 is a diagram showing an example of switching of screens displayed in the display section.

First, description is made for processing of switching display of a background image in response to movement of an avatar 151 in FIG. 14 in a virtual space displayed in the display section 13.

Substantially at the center of a display portion 13A in FIG. 14, the back of the avatar 151 is shown. The avatar 151 can be moved by operating the rotation input section 14. In the display portion 13A, an object 161 is displayed at the center of the screen (in front of the avatar 151), and an object 162 is displayed on the left thereof. An object 164 is displayed on the right of the object 161 relative to the front of the avatar 151. In the display portion 13A, the avatar 151 is supposed to stand currently at a position P21. A position P22 is a position spaced to the left from the position P21 by a predetermined distance.

For example, in a state of the screen displayed in the display portion 13A in FIG. 14, the control section 111 determines whether or not the rotation detection portion 121 detects rotation at step S21 in FIG. 12. In other words, the control section 111 determines whether or not turning of the orientation of the avatar 151 is instructed.

At step S21, when the control section 111 determines that turning of the orientation of the avatar 151 is not instructed, it proceeds to step S22 where it determines whether or not the press detection section 122 detects press of the upper button 42A. In other words, the control section 111 determines whether or not proceeding of the avatar 151 is instructed.

When the control section 111 determines that proceeding of the avatar 151 is directed at step S22, it proceeds to step S23 where it causes the avatar 151 to proceed in the virtual space and displays with scaled-up the landscape image (zoom-display) displayed on the display section 13.

For example, in the state of the screen shown in the display section 13A in FIG. 14, when the upper button 42A is pressed, the avatar 151 is caused to proceed a predetermined distance in the virtual space, and the display becomes that shown as a display section 13B indicated by an outline arrow A21. Specifically, in the display section 13B in FIG. 14, the objects 161 and 162 are displayed with scale-up as compared with the display in the display section 13A. Since the object 164 is moved to the outside of a visual field, it is not displayed.

On the other hand, at step S22, when the control section 111 determines that the press detection portion 122 detects no press of the upper button 42A, it proceeds to step S24 where it determines whether or not press of the lower button 42C is detected. In other words, the control section 111 determines whether or not receding of the avatar 151 is instructed.

When the control section 111 determines that receding of the avatar 151 is instructed at step S24, it proceeds to step S25 where it causes the avatar 151 to recede in the virtual space and performs scaled-down display of the background (wide-display) displayed in the display section 13.

For example, in the state of the screen shown in the display section 13B in FIG. 14, when the lower button 42C is pressed, the respective objects are displayed with scale-down and the background of a wider area is displayed as shown in the display section 13A.

When the control section 111 determines that the press detection section 122 detects no press of the low button 42C at step S24, it proceeds to step S26 where it detects whether or not press of the left button 42B is detected. In other words, the control section 111 determines whether or not move of the avatar 151 to the left is instructed.

When the control section 111 determines that move of the avatar 151 to the left is instructed at step S26, it proceeds to step S27 where it moves the avatar 151 to the left and scrolls the background displayed in the display section 13 to the right.

For example, in a state of the screen shown in the display section 13A in FIG. 14, when the left button 42B is pressed, the avatar 151 is moved to the position P22 and the background is scrolled to the right. The display becomes that shown as a display section 13C indicated by an outline arrow A22.

In the display section 13C, the object 161 is displayed on the right and in front of the avatar 151, and an object 165, which is not displayed in the display section 13A, is newly displayed.

On the other hand, when the control section 111 determines that the press detection section 122 detects no press of the left button 42B, it proceeds to step S28 where it determines whether or not press of the right button 42D is detected. In other words, the control section 111 determines whether or not move of the avatar 151 to the right is instructed.

When the control section 111 determines that move of the avatar 151 to the right is instructed at step 28, it proceeds to step S29 where it moves the avatar 151 to the right and scrolls the background displayed in the display section 13 to the left.

For example, in the state in which the screen of the display section 13C in FIG. 14 is displayed, when the right button 42D is pressed, the background is scrolled to the left to switch the display range, and the avatar 151 is moved to the position P21, and the display becomes that shown in the display section 13A.

When the control section 111 determines that press of the right button 42D is not detected at step S28, it recognizes that the central button 41 is pressed, and it proceeds to processing at step S30. In the processing at step S30, the control section 111 executes processing (an action) previously set to be executed when the central button 41 is pressed.

For example, when talking to a partner in front of the avatar 151 is set as an action at the time when the central button 41 is pressed, the control section 111 causes the avatar 151 to perform the action of talking to the partner in front at step S30.

On the other hand, when it is determined that the rotation detection section 121 detects rotation at step S21, the control section 111 determines whether or not rotation in the clockwise direction is detected at step S31 in FIG. 13. In other words, the control section 111 determines whether or not rotation of the front of the avatar 151 in the clockwise direction is instructed with the current position set as a reference in the horizontal plane of the virtual space.

When the control section 111 determines that rotation in the clockwise direction is detected at step S31, it proceeds to step S32. At step S31, the control section 111 rotates the orientation of the avatar 151 in the clockwise direction and rotates the background in the counterclockwise direction relative to the current position of the avatar 151 in the horizontal plane of the virtual space in accordance with the calculated rotation amount.

For example, when the rotation input section 14 is rotated in the clockwise direction by a predetermined angle in the state of the screen shown in the display section 13A in FIG. 14, the screen displayed in the display section 13 becomes that shown as a display section 13D indicated by an outline arrow A23.

Specifically, the background is rotated in the counterclockwise direction in the horizontal plane about the position P21. For example, the object 164 displayed at the right end of the screen in the display section 13A is moved substantially to the front of the avatar 151 and displayed.

On the other hand, when the control section 111 determines that no rotation in the clockwise direction is detected at step S31, it recognizes that rotation in the counterclockwise direction is detected, and it proceeds to step S33. At step S33, the control section 111 rotates the orientation of the avatar 151 in the counterclockwise direction and rotates the background in the clockwise direction relative to the current position of the avatar in accordance with the calculated rotation amount.

For example, when the rotation input section 14 is rotated in the counterclockwise direction by a predetermined amount in the state of the screen shown in the display section 13D in FIG. 14, the displayed screen becomes that shown in the display section 13A.

Figure 15:
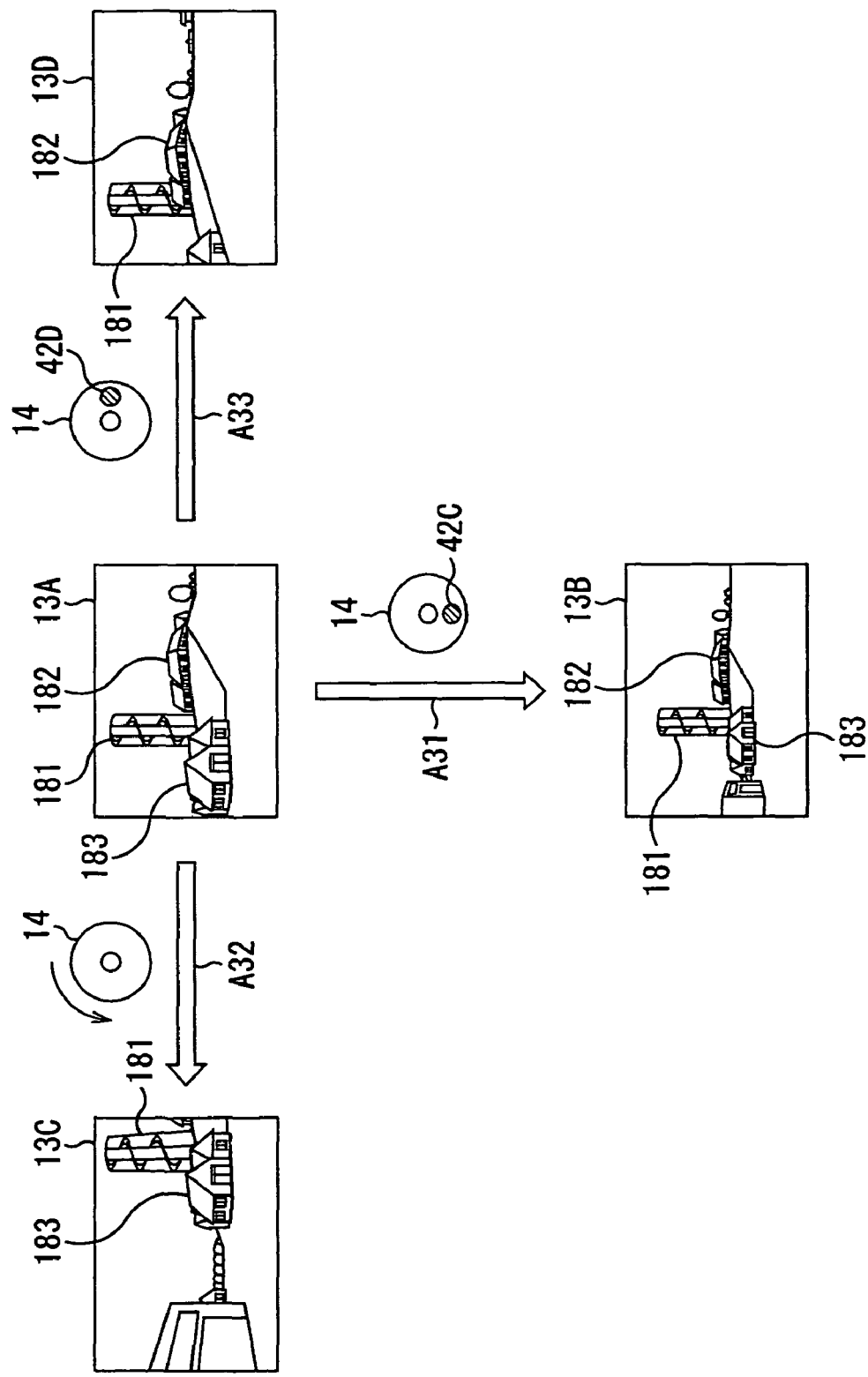
FIG. 15 is a diagram showing another example of switching of screens displayed in the display section.

While the above description has been made for the back face of the avatar 151 constantly displayed at the center of the display section 13, it is possible that, as shown in FIG. 15, the avatar 151 is not displayed, a screen corresponding to the visual field of the user who utilizes the mobile phone 1 is displayed, and similarly, display of the background is switched with movement in the virtual space.

For example, if display of a display section 13A in FIG. 15 is displayed, and when the lower button 42C of the rotation input section 14 is pressed, the screen displayed in the display section 13 is wide displayed one as shown as a display section 13B indicated by an outline arrow A31. In the display section 13B, objects 181 to 183 are displayed in a scaled-down manner as compared with the screen of the display section 13A.

In addition, for example in a state in which the screen shown in the display section 13A in FIG. 15 is displayed, when the rotation input section 14 is rotated in the counterclockwise direction, the display becomes that shown as a display section 13C indicated by an outline arrow A32 in which the background is rotated in the clockwise direction in the horizontal plane about the current position in the virtual space. Specifically, the left direction in the display section 13A becomes the front and the object 181 is displayed at the right end of the screen.

In addition, for example, in the state of the screen of the display section 13A in FIG. 15 displayed, when the right button 42D of the rotation input section 14 is pressed, the display becomes that indicated by an outline arrow A33. The objects 181 and 182 are shifted to the left and displayed as compared with the display of the display section 13A.

As described above, the user can switch the display of the three-dimensional image in the display section 13 by operating the rotation input section 14.

Next, description is made for processing of switching display of a map (a three-dimensional image) as a bird view in the display section 13 in response to input from the rotation input section 14.

Figure 16:
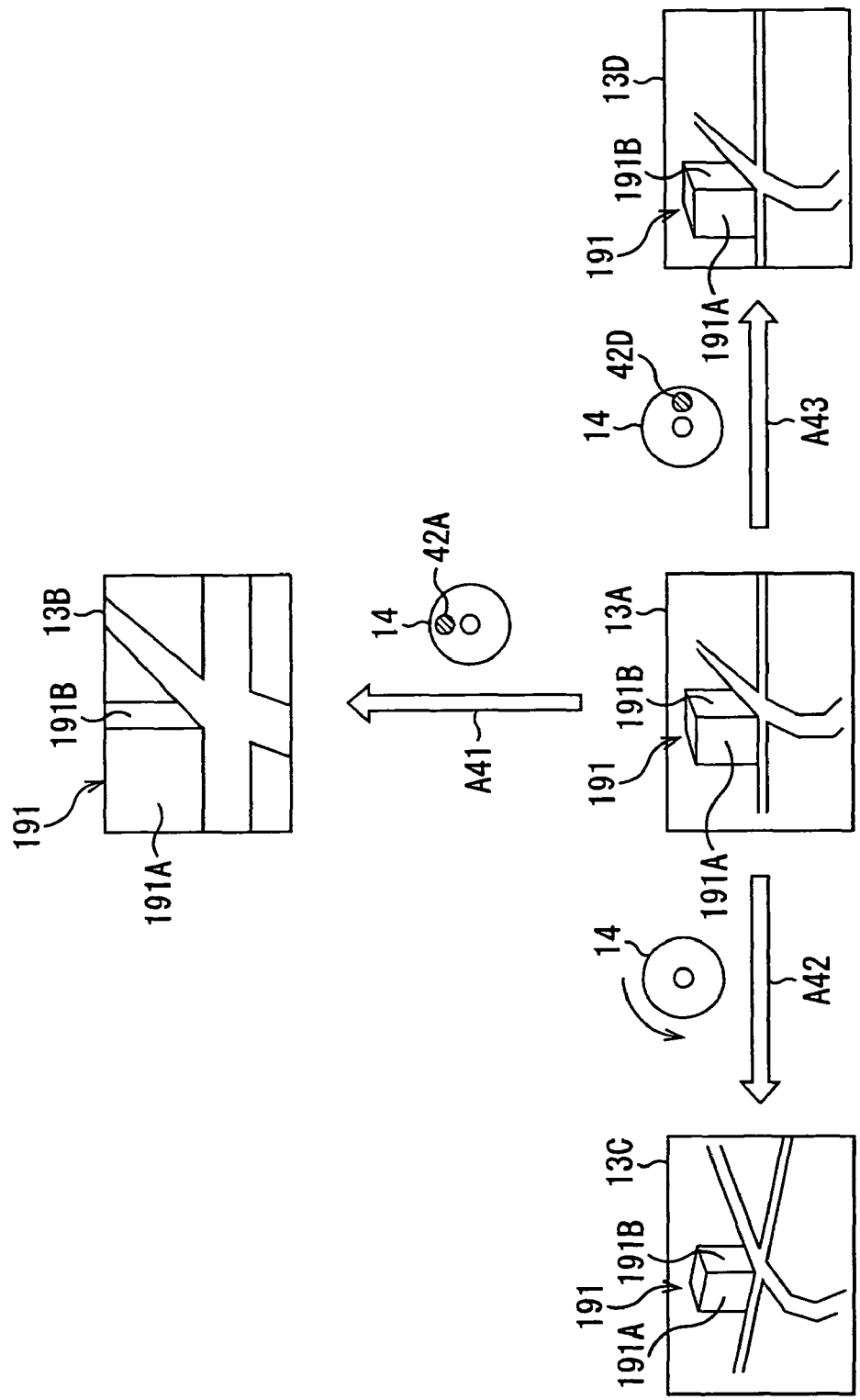
FIG. 16 is a diagram showing a further example of switching of screens displayed in the display section.

For example, if a map shown in a display section 13A in FIG. 16 is displayed, and when the upper button 42A of the rotation input section 14 is pressed, the screen displayed in the display section 13 is zoom displayed as the screen of a display section 13B indicated by an outline arrow A41. In the display section 13B of FIG. 16, as compared with the display section 13A, the scale is changed to display an object 191 in the scaled-up manner.

In addition, for example, if the screen shown in the display section 13A in FIG. 16 is displayed, and when the rotation input section 14 is rotated in the counterclockwise direction, the display becomes that indicated by an outline arrow A42 in which the background is rotated in the clockwise direction in the horizontal plane, and a wider area of a plane 191B of the object 191 is displayed (moved to the front of the user for display).

In addition, if the screen shown in the display section 13A in FIG. 16 is displayed, and when the right button 42D of the rotation input section 14 is pressed, the display becomes that shown as a display section 13D indicated by an outline arrow A43. The object 191 is shifted to the left and displayed as compared with the display of the display section 13A.

As described above, the image is rotated and displayed with the rotation of the rotation input section 14, so that it is possible to perform operation with a sense of synchronization with the display on the screen as compared with a case where the plurality of buttons are operated.

In addition, since the single input section allows various operations, reduction in size can be achieved as compared with a mobile phone having a plurality of buttons individually provided.

While the above description has been made for the rotation operation section 14 provided for the mobile phone 1, it is possible that an input section having the similar configuration is provided for a portable information terminal such as a PDA (Personal Digital Assistant) and a portable type personal computer, for example. Also, it can be applied to a portable information terminal as a various types of remote controllers for use in a television receiver, a video recorder, a car navigator and the like.

While the aforementioned series of processing may be executed by hardware, they may be executed by software. When the series of processing is executed by software, programs forming the software are installed from a network or a recording medium to a computer incorporated in dedicated hardware or, for example, a general-purpose personal computer capable of executing various functions by installing various programs thereon.

As shown in FIG. 6, the recording medium is formed of a package media realized by the magnetic disc 211 (including a floppy disk), the optical disc 212 (including a CD-ROM (Compact Disk-Read Only Memory) and a DVD (Digital Versatile Disk)), the magneto-optical disc 213 (including an MD® (Mini-Disk)), or the semiconductor memory 214, which are distributed for providing a user with the program and on which the programs are recorded, apart from the apparatus body. In addition thereto, it is formed of a ROM which is provided for a user in the state in which it is previously incorporated in the apparatus body and which has programs recorded thereon, or a hard disk included in a storage section, or the like.

In the specification, the step for describing the program recorded on the recording medium includes not only processing executed on a time series basis in the described order but also processing executed in parallel or separately which is not necessarily executed on a time series basis.

Second Embodiment

Next, description is hereinafter made for a second embodiment in the present invention based on the drawings.

(1) General Configuration of Mobile Phone

Figure 17:
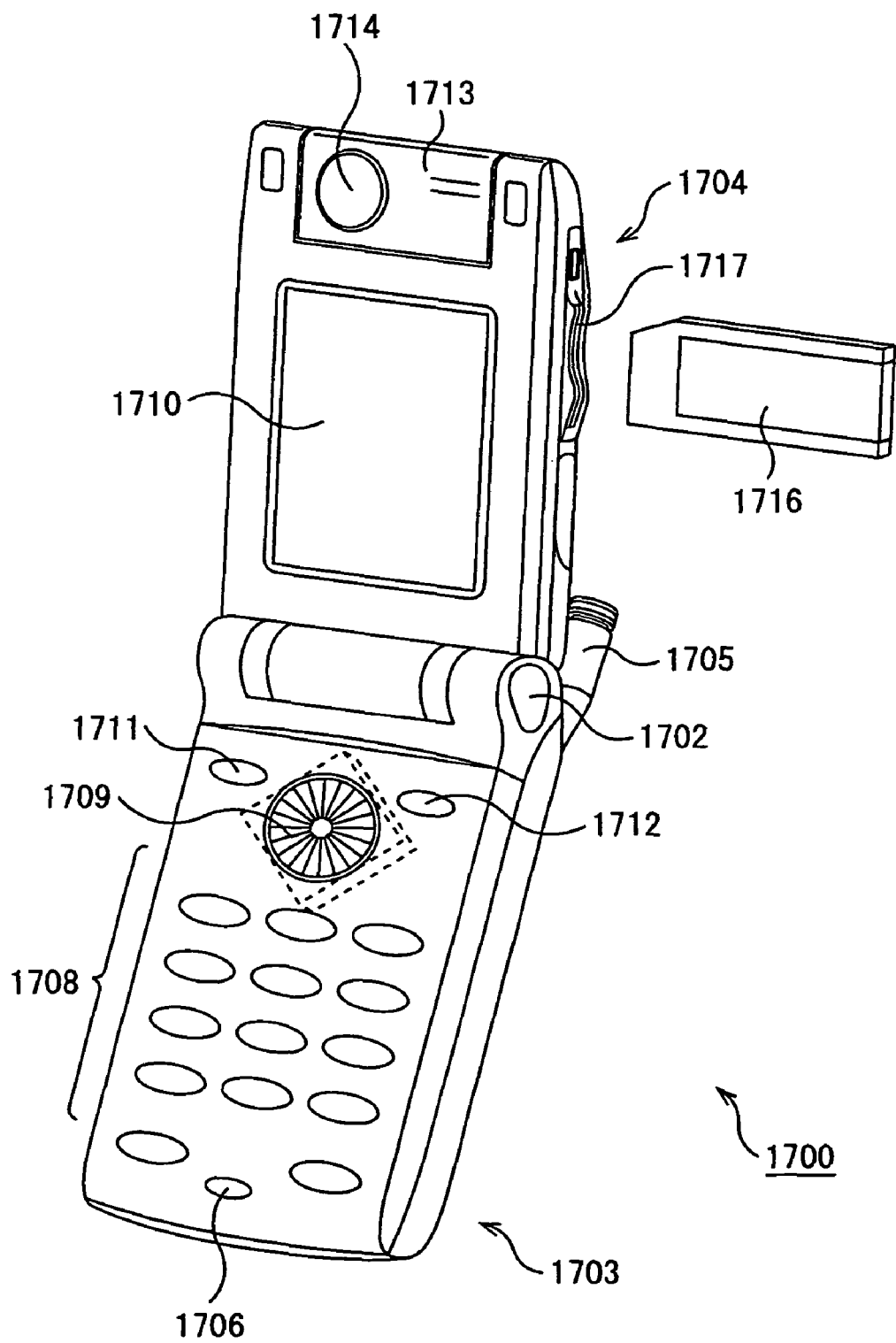
FIG. 17 is a perspective view showing a general configuration of a mobile phone according to the present invention.

In FIG. 17, a reference numeral 1700 generally shows a mobile phone of the second embodiment according to the present invention. The mobile phone 1700 is divided into a lower housing 1703 and an upper housing 1704 with a central hinge portion 1702 as a boundary, and is formed to be foldable through the hinge portion 1702.

In the lower housing 1703, an antenna 1705 for transmission and reception is attached on the right side at the upper end of the back face in a telescopic state. The mobile phone 1700 is formed to transmit and receive radio waves to and from a base station (not shown) through the antenna 1705.

In the lower housing 1703, a microphone 1706 is provided in a lower portion on the front face for collecting voice of a user during a call.

In addition, in the lower housing 1703, operation keys 1708 are provided at its center on the front surface such as numeric keys from "0" to "9," a calling key, a redial key, a terminating and power key, a clear key and an e-mail key. On the upper side of the operation keys 1708, provided is a rotation input section in a disklike shape (hereinafter referred to as a disc jog) 1709 which enables press in four directions of upward, downward, leftward and rightward directions and in the center, and rotation operation to the left and right. The operation of the operation keys 1708 and the disc jog 1709 allows the mobile phone 1700 to execute various processing such as selections of menu items, calling processing, formation of an e-mail text, and data communications.

For example, when a central button (later described) of the disc jog 1709 is pressed after a desired telephone number is selected from a list of telephone numbers displayed in a display section 1710 in response to a rotation operation of the disc jog 1709 by a user, the mobile phone 1700 automatically establishes the selected telephone number and executes calling processing to the telephone number.

A battery pack, not shown, is mounted on the back face side of the lower housing 1703. When the operation keys 1708 are operated to turn on the power, power is supplied from the battery pack to an internal circuit block to start to an operable state.

On the other hand, a rotatable camera section 1713 is provided in the center at the upper end of the upper housing 1704. The mobile phone 1700 can capture an image of a desired subject through a CCD (Charge Coupled Device) camera 1714 of the camera section 1713 and store the image in a RAM (Random Access Memory) or a memory stick (later described) contained in the mobile phone 1700.

Figure 18:
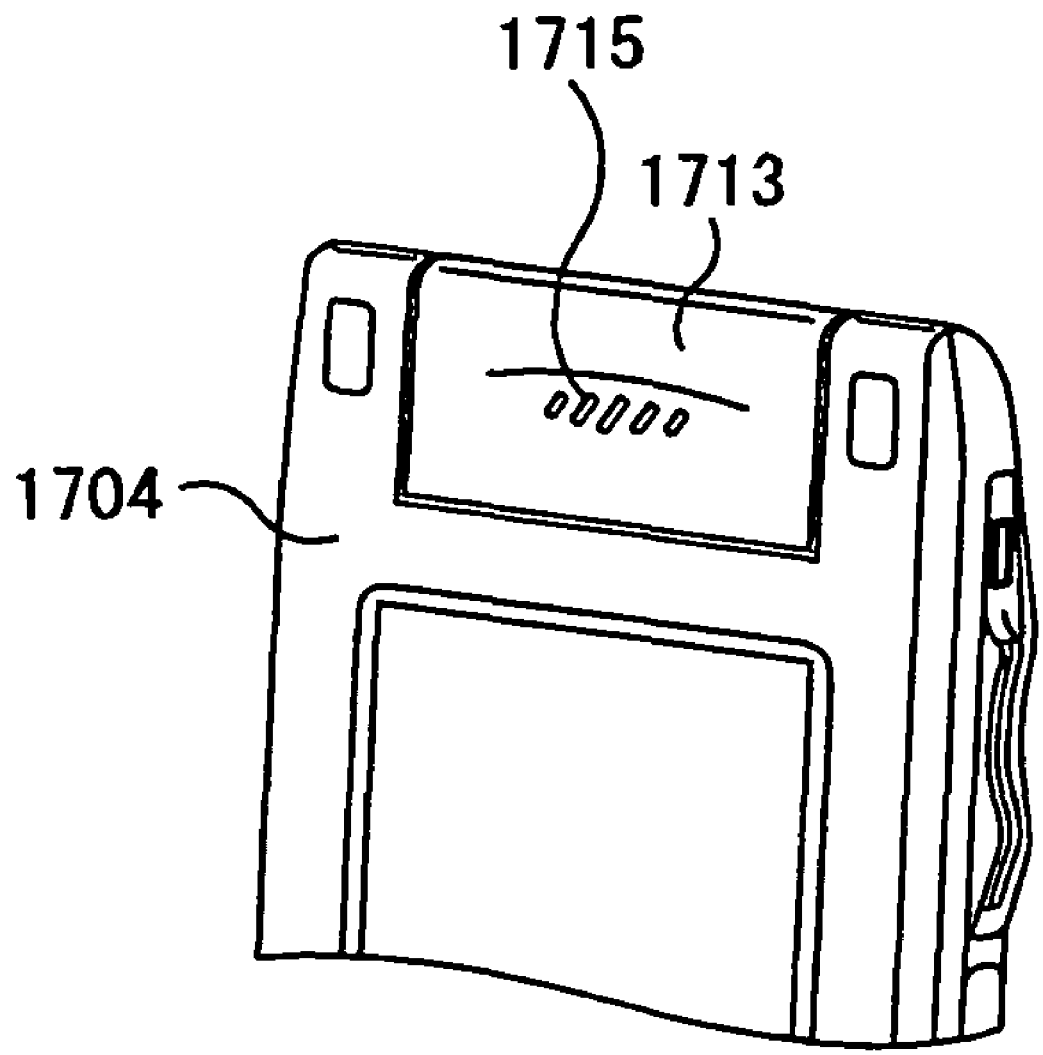
FIG. 18 is a perspective view showing a rotation state of a camera section.

When the camera section 1713 is reversed and positioned by a user, as shown in FIG. 18, a speaker 1715 provided in the center on the back face side of the camera section 1713 is located in front, which makes switching to a normal voice call state.

In the front of the upper housing 1704, the display section 1710 formed of an LCD (Liquid Crystal Display) is provided below the camera section 1713. The mobile phone 1700 can display any information such as menus corresponding to various functions, a reception state of radio waves, remaining battery power, a sending history, a receiving history, an e-mail text, a telephone book, schedules, and images captured by the camera section 1713 in the display section 1710.

The mobile phone 1700 is formed to easily execute various image editing processing such as scaling (that is, a change in magnification), rotation, and movement in upper, lower, left, and right directions by operations through the disc jog 1709 as a multi-function input means on various images such as an image captured by the camera section 1713 or an image transmitted from another mobile phone, or an image downloaded from a server on the Internet.

For example, when the image size of an image downloaded from a server on the Internet is smaller than the display size of the display section 1710, a user can scale up the image through the aforementioned image editing processing to display the downloaded image in the whole display section 1710. In addition, when an image captured by the camera section 1713 is inclined, a user can rotate the image through the aforementioned image editing processing to modify and display the captured image in a horizontal position.

In addition, a memory stick slot 1717 is provided for loading a removable memory stick (trademark by Sony Corp.) in an upper portion on the right side of the upper housing 1704.

The memory stick 1716 is a kind of flash memory card developed by the Applicant, Sony Corp., and is a storage medium which stores a flash memory element formed of an EEPROM (Electrically Erasable Programmable Read Only Memory) which is an electrically rewritable and erasable non-volatile memory in a small and thin plastic case. The memory stick 1716 allows writing and reading of various data such as images, audio, and music.

Thus, the mobile phone 1700 has a configuration which allows the memory stick 1716 to be removably loaded for use, so that data can be shared with another electronic device through the memory stick 1716.

(2) Circuit Configuration of Mobile Phone

Figure 19:
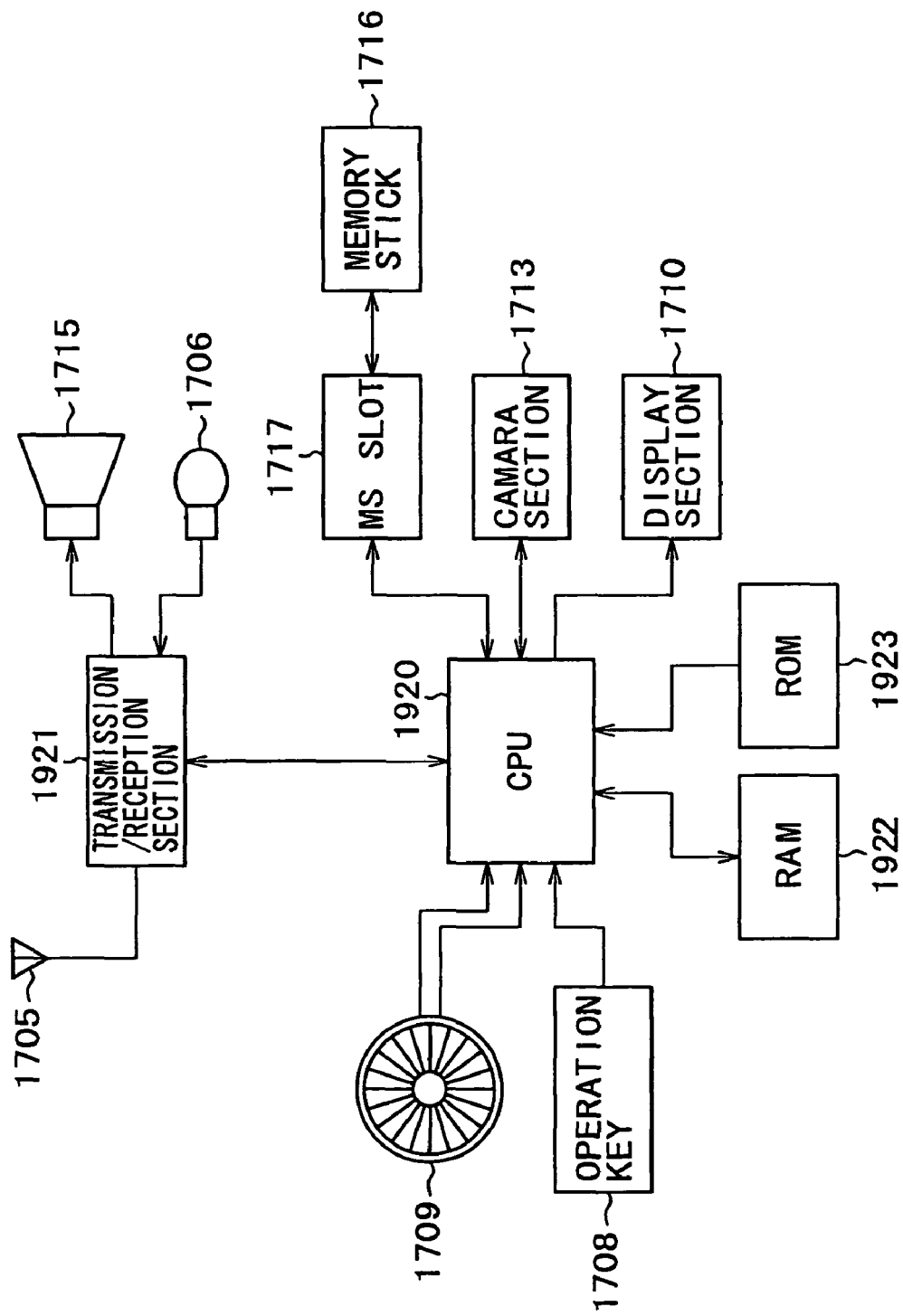
FIG. 19 is a block diagram showing a circuit configuration of the mobile phone.

Next, the circuit configuration of the mobile phone 1700 is described with reference to FIG. 19. In practice, in the mobile phone 1700, connected to a CPU (Central Processing Unit) 1920 for collectively controlling various functions of the mobile phone 1700 is the operation keys 1708, the disc jog 1709, the display section 1710, the camera section 1713, the memory stick slot 1717, a transmission/reception section 1921, and a RAM 1922 which is used as a work area of the CPU 1920 and used as a storage means for a telephone book list or image data. In addition, connected to the CPU 1920 is a ROM 1923 which stores various programs such as an image editing program (later described) executed by the CPU 1920 and device drivers.

The CPU 1920 of the mobile phone 1700 controls the transmission/reception section 1921 in response to various processing instructions input through the operation keys 1708 or the disc jog 1709 to perform various processing such as calling processing, terminating processing, image-capturing processing and video editing processing and displays information in accordance with various processing instructions in the display section 1710.

For example, the CPU 1920 of the mobile phone 1700 controls the transmission/reception section 1921 to read the telephone number list from the RAM 1922 in response to direction information input through the disc jog 1709, to display part of the telephone number list sequentially in the display section 1710, and to perform calling processing to a selected telephone number.

In this case, the mobile phone 1700 converts a voice signal collected by the microphone 1706 into voice data by the transmission/reception section 1921, and then performs modulation processing thereon, and transmits it to a base station (not shown) through the antenna 1705.

In addition, the mobile phone 1700 performs demodulation processing by the transmission/reception section 1921 on a received signal received through the antenna 1705, converts the resulting voice data into an analog voice signal, and outputs it through the speaker 1715.

(3) Configuration of Disc Jog

Figure 20:
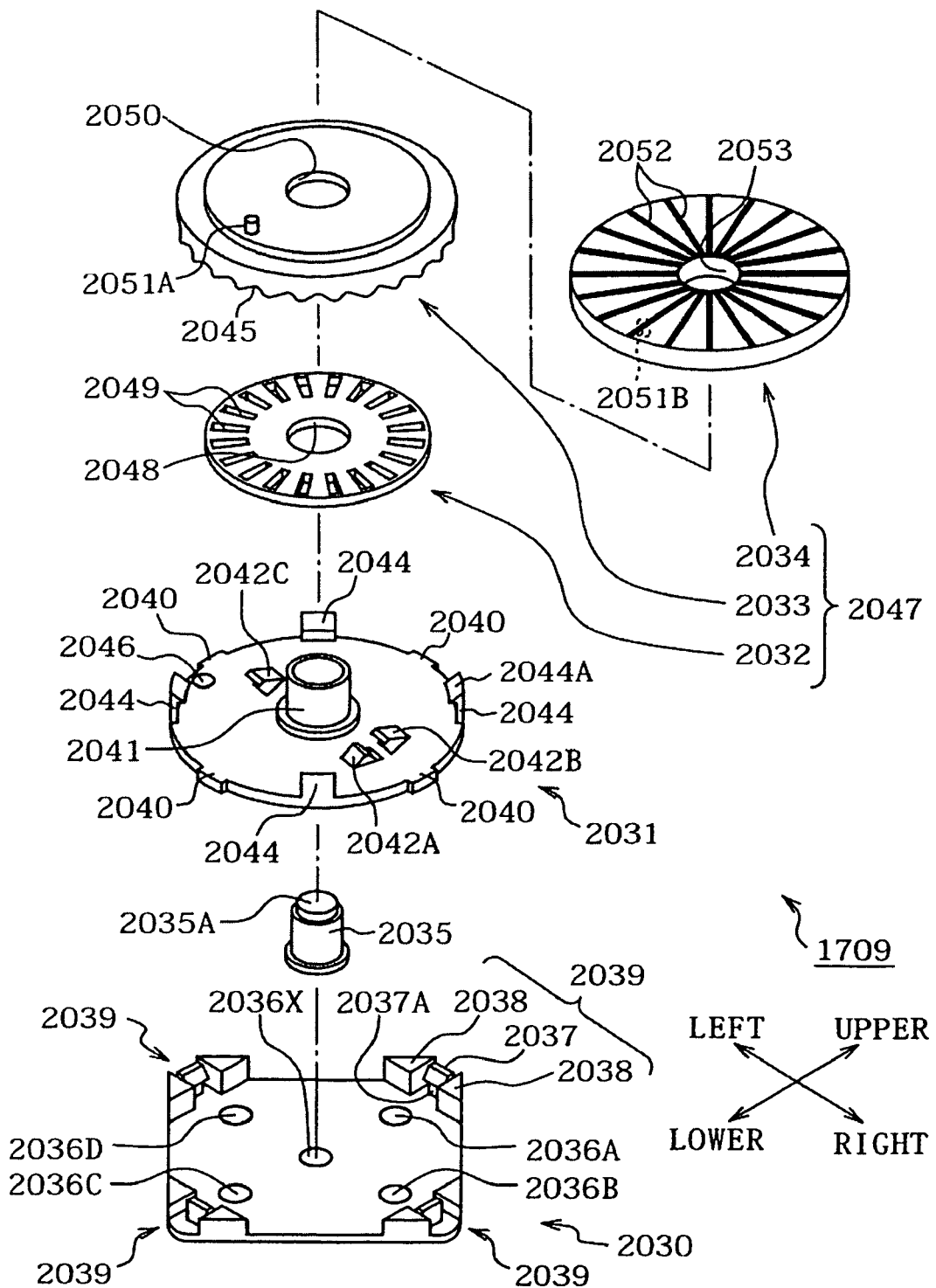
FIG. 20 is a schematic diagram showing a structure of a disc jog.

Next, the configuration of the disc jog 1709 as the multi-function input means is described. As shown in FIG. 20, the disc jog 1709 is formed of a base 2030, a holder 2031, a scale 2032, a dial body 2033, an operation dial 2034, and a central button 2035. The configuration of the disc jog 1709 is basically similar to that of the rotation input section 14 shown in the first embodiment.

The base 2030 is a generally rectangular plate made of, for example, an insulating resin such as plastic. A central switch 2036X is provided in a central portion on the front surface. Four peripheral switches 2036A to 2036D are provided at regular intervals and 90 degrees apart from each other around the central switch 2036X. These five switches 2036 (2036A to 2036D and 2036X) are each formed of push switches, respectively, and electrically connected to a press detection section in a disc jog interface.

A holder limiting section 2039 consisting of an upper movement limiting piece 2037 and two rotation limiting pieces 2038 provided on both sides thereof and slightly spaced therefrom is provided in each of four corners on the front face of the base 2030. On the other hand, in the periphery of the holder 2031, four limited pieces 2040 are formed to protrude at positions corresponding to the respective holder limiting section 2039 such that a nail portion 2037A provided toward the inside (that is, toward the center of the base 2030) at the upper end of each upper movement limiting piece 2037 limits an upper movement amount of each limited piece 2040 and each rotation limiting piece 2038 limits rotation of each limited piece 2040. Thus, the base 2030 limits rotation of the holder 2031 and holds the holder 2031 to be swingable in an range permitted by the upper movement limiting piece 2037.

The holder 2031 is a disk made of an insulating resin, and in its center of the front face, a dial holding cylinder 2041 is provided to protrude for rotatably holding the dial body 2033. The inner face of the dial holding cylinder 2041 is open to the back face of the holder 2031, and the central button 2035 is housed inside the dial holding cylinder 2041 in a vertically movable state.

In addition, four dial body holding pieces 2044 are provided between the limited pieces 2040 in the periphery of the front face of the holder 2031. The holder 2031 rotatably holds the dial body 2033 having the scale 2032 fixed on the back face by nail portions 2044A provided toward the inside (that is, toward the center of the holder 2031) at the upper ends of the four dial body holding pieces 2044.

The scale 2032 is formed of a disklike metal plate. The scale 2032 has a hole 2048 in the center through which the dial holding cylinder 2041, and a number of slits 2049 in a long hole shape radially and at regular angle intervals about the hole 2048.

In addition, three brushes 2042A, 2042B, and 2042C made of an elastic member having conductivity are provided on the front face of the holder 2031. Each of the brush 2042A, 2042B, and 2042C is electrically connected to a rotation detection section in the disc jog interface through wiring, not shown. The brushes 2042A and 2042B are arranged in contact with the slit 2049 of the scale 2032 fixed to the back face of the dial body 2033, and the brush 2042C is arranged in continuous contact with the back face of the periphery of the scale 2032.

Figure 21A:
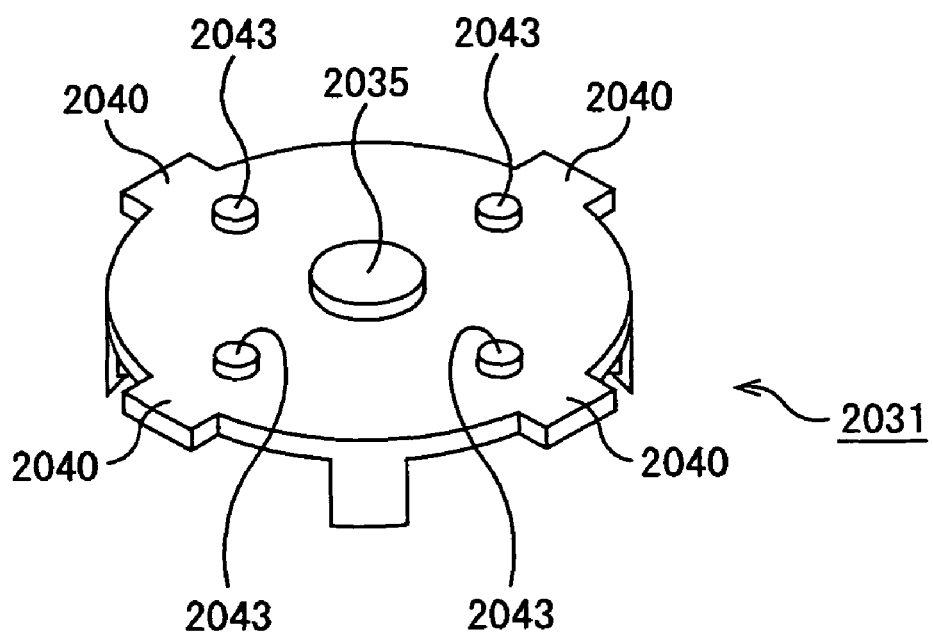
FIG. 21A is a schematic diagram showing a back face structure of a holder.
Figure 21B:
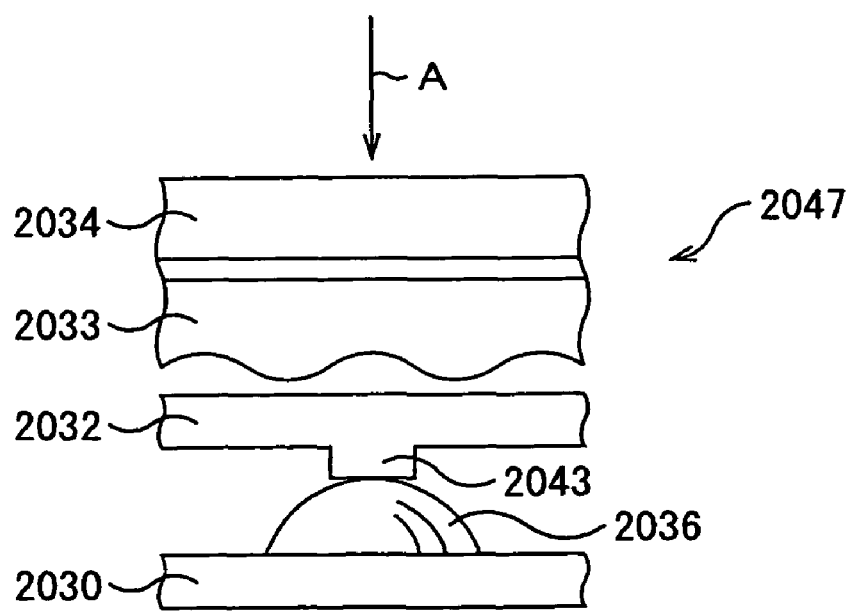
FIG. 21B is a schematic diagram showing a cross-section of the back face structure of the holder.

On the other hand, as shown in FIG. 21A, four switches press protrusions 2043 are provided at positions corresponding to the peripheral switches 2036A to 2036D (FIG. 20) on the back face of the holder 2031. In the state in which the holder 2031 is set to the base 2030, each switch press protrusion 2043 is positioned on the associated peripheral switch 2036 as shown in FIG. 21B. When a pressing force is applied to the holder 2031 through the dial 2047 in the direction of an arrow A, the switch press protrusion 2043 presses the associated peripheral switch 2036 to turn it on.

In the state in which the central button 2035 is inserted into the dial holding cylinder 2041, the bottom face of the central button 2035 is positioned on the central switch 2036X (FIG. 20). When a pressing force is applied to the central button 2035, the bottom face of the central button 2035 presses the central switch 2036X to turn it on.

Figure 22A:
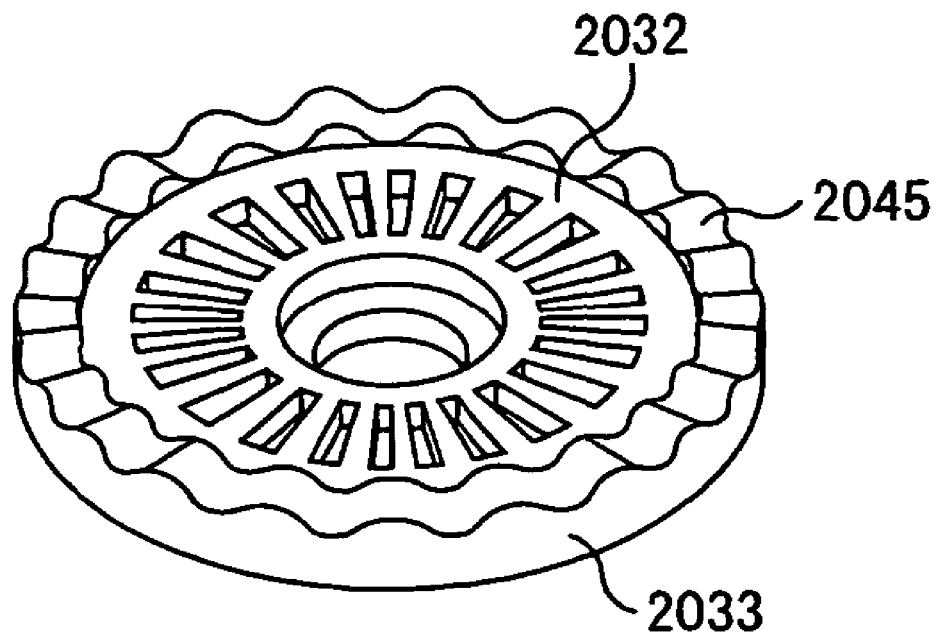
FIG. 22A is a schematic diagram showing a back face structure of a dial body.
Figure 22B:
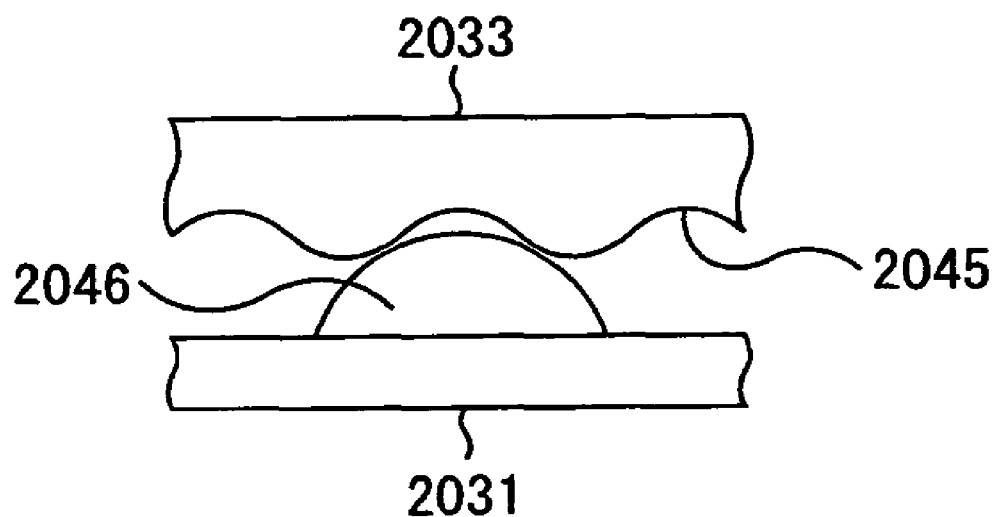
FIG. 22B is a schematic diagram showing a cross-section of the back face structure of the dial body.

In addition, a click protrusion 2046 is protrusively provided in a peripheral portion of the front face of the holder 2031. As shown in FIG. 22A, a wave-shaped click unevenness 2045 is provided on the back face of the dial 2033. The click protrusion 2046 is fitted with play into the wave-shaped click unevenness 2045 provided on the back face of the dial body 2033 to generate a click feel for each predetermined rotation angle (hereinafter referred to as a rotation click) when a user rotationally operates the dial 2047 formed of the scale 2032, the dial body 2033, and the operation dial 2034. The click feel notifies the user of a rotation operation amount of the dial 2047 through a touch when the dial 2047 is rotated in predetermined rotation angles.

The dial body 2033 has a hole 2050 in its center through which the dial holding cylinder 2041 is inserted. A cylindrical transmission protrusion 2051A is provided near the edge portion on the front face of the dial body 2033. The transmission protrusion 2051A is fitted into a transmission depression 2051B formed in the back face of the operation dial 2034 to transmit a rotation force applied to the operation dial 2034 to the dial body 2033.

A number of grooves 2052 are radially formed on the front face of the operation dial 2034 for generating appropriate friction at the time of rotation operation to improve operability. In addition, a central hole 2053 is provided in a central portion on the front face of the operation dial 2034 to expose a top portion 2035A of the central button 2035 inserted into the dial holding cylinder 2041 to allow press operation of the central button 2035.

Figure 23:
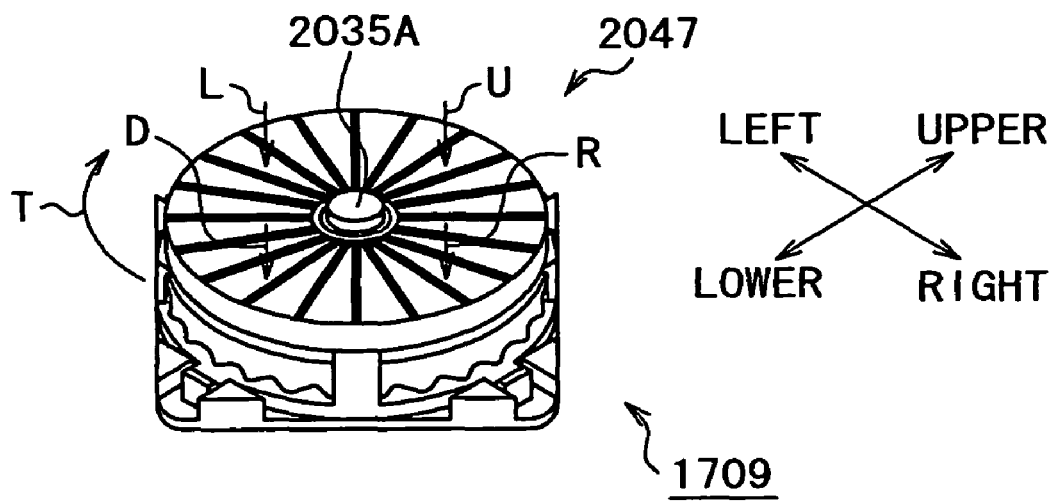
FIG. 23 is a perspective view for use in description of operations on the disc jog.

Next, a rotation operation of the disc jog 1709 is described. As shown in FIG. 23, when the dial 2047 of the disc jog 1709 is rotationally operated in a direction of an arrow T or an opposite direction, the rotation operation force is transmitted to the dial body 2033 through the transmission protrusion 2051A fitted into the transmission depression 2051B (FIG. 20) formed in the operation dial 2034. Then, the dial body 2033 is rotated together with the scale 2032 to change the electrically conducting state between the brush 2042C and the brush 2042A, and between the brushes 2042C and 2042B.

As described above, the brush 2042C and the scale 2032 are always in electrical conduction. When the brush 2042A is positioned on the slit 2049 of the scale 2032, the brush 2042C is not in electrical conduction with the scale 2032, and thus the brush 2042C is not in electrical conduction with the brush 2042A. In contrast, when the brush 2042A is positioned in a portion of the scale 2032 where the slit 2049 is not present, the brush 2042C is in electrical conduction with the scale 2032, and thus the brush 2042C is in electrical conduction with the brush 2042A through the scale 2032. The same applies to the brush 2042B.

In this manner, when the dial 2047 is rotationally operated, the conducting states between the brush 2042C and the brush 2042A and between the brush 2042C and the brush 2042B are changed in pulses (hereinafter these are referred to as rotation pulses). The CPU 1920 detects a rotation operation amount (that is, a rotation angle) and a rotation direction of the dial 2047 based on the two rotation pulses.

In the disc jog 1709, the rotation angle of the dial 2047 is not limited. Thus, a continuous operation can be easily input simply by rotating the dial 2047, and an operation can be input at arbitrary intervals by a user changing the rotation speed of the dial 2047.

Next, the press operation of the disc jog 1709 is described. As shown in FIG. 23, when a portion of the dial 2047 above the center is pressed (in a direction of an arrow U), the dial 2047 is swung together with the holder 2031. This swing causes the switch press protrusion 2043 (FIG. 21A) of the holder 2031 to press the peripheral switch 2036A (FIG. 20) to turn it on. Similarly, when a portion of the dial 2047 on the right of the center is pressed (in a direction of an arrow R), the peripheral switch 2036B is turned on. When a portion thereof below the center is pressed (in a direction of an arrow D), the peripheral switch 2036C is turned on. When a portion thereof on the left of the center is pressed (in a direction of an arrow L), the peripheral switch 2036D is turned on.

When the top portion 2035A of the central button 2035 exposed at the center of the dial 2047 is pressed (FIG. 23), the bottom portion of the central button 2035 presses the central switch 2036X (FIG. 20) to turn it on.

The CPU 1920 detects a press operation in upper, lower, left, and right directions on the dial 2047 (hereinafter this is referred to as a cross direction press operation) and a press operation on the central button 2035 (hereinafter this is referred to as a center press operation) based on the conducting states of the five switches 2036 (the peripheral switches 2036A to 2036D and the central switch 2036X).

In practice, the CPU 1920 monitors an operation on the aforementioned disc jog 1709 by a disc jog monitoring program (that is, a disc jog driver), and when occurrence of an operation is detected, the disc jog driver generates an interrupt signal in response thereto and notifies the CPU 1920.

In this manner, the disc jog 1709 is formed to allow easy input of the cross direction press operation as a multi-direction press operation on the dial 2047, the center press operation on the central button 2035, and a rotation operation on the dial 2047.

(4) Image Editing Processing of Mobile Phone

Next, image editing processing in the mobile phone 1700 is described.

Figure 24:
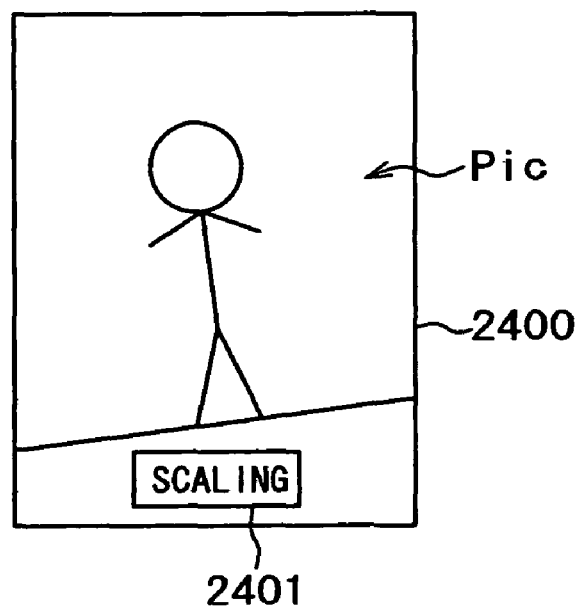
FIG. 24 is a schematic diagram showing an image editing screen.

When an "image edit" menu is selected on a main menu screen (not shown), the CPU 1920 of the mobile phone 1700 starts an image editing program, later described, to move to an image editing mode, and displays an image editing screen 2400 shown in FIG. 24 in the display section 1710.

In the image editing screen 2400, an image Pic as an editing subject is displayed over the entire screen, and a mode display portion 2401 is displayed in a lower portion for displaying an operation mode (a rotation mode or a scaling mode), later described. The mode display portion 2401 is semitransparently displayed such that the mode display portion 2401 does not shield the editing image Pic. In addition, the CPU 1920 starts an operation mode as a rotation mode at the time of start of display of the image editing screen 2400, and alternately switches the scaling mode and the rotation mode in response to a continuous press operation (hereinafter this is referred to as a long press operation) on the central button 2035.

Then, the CPU 1920 performs image editing processing such as scaling, rotation, movement in upper, lower, left, and right directions (scroll) on the editing image Pic in accordance with the operation mode in response to the rotation operation and the cross direction press operation on the disc jog 1709.

Specifically, when the dial 2047 of the disc jog 1709 is rotationally operated in a right-handed direction in the rotation mode, the CPU 1920 rotates the editing image Pic in response thereto in the right-handed direction with the center of the mode display portion 2401 as the rotation axis. Similarly, when the dial 2047 is rotationally operated in a left-handed direction, the CPU 1920 rotates the editing image Pic in the left-handed direction. At this point, the CPU 1920 rotates the editing image Pic by a predetermined reference rotation angle in response to one rotation click on the dial 2047. The reference rotation angle can be changed arbitrarily by a user.

In this manner, the CPU 1920 rotates the editing image Pic in accordance with the rotation operation amount and the rotation operation direction of the dial 2047 in the rotation mode.

The rotation axis direction of the dial 2047 substantially matches the rotation axis direction of the image Pic in the image editing processing. This causes the image Pic to be rotated in the same direction as the rotation operation direction of the dial 2047 and a user can be provided with an instinctive and real operation feel as if he could rotate the image Pic with his finger.

In addition, when the dial 2047 of the disc jog 1709 is rotationally operated in the right-handed direction in the scaling mode, the CPU 1920 scales up the editing image Pic in response thereto. Similarly, when the dial 2047 is rotationally operated in the left-handed direction, the CPU 1920 scales down the editing image Pic. At this point, the CPU 1920 scales up or down the editing image Pic at a predetermined reference scale-up/scale-down rate in response to one rotation click on the dial 2047. This scale-up/scale-down rate can be arbitrarily changed by a user.

In addition, in both the operation modes of the rotation mode and the scaling mode, when the dial 2047 is pressed in the cross direction, the CPU 1920 moves the editing image Pic in response thereto in the pressed direction for display (switches the original image and displays the moved image).

Figure 25:
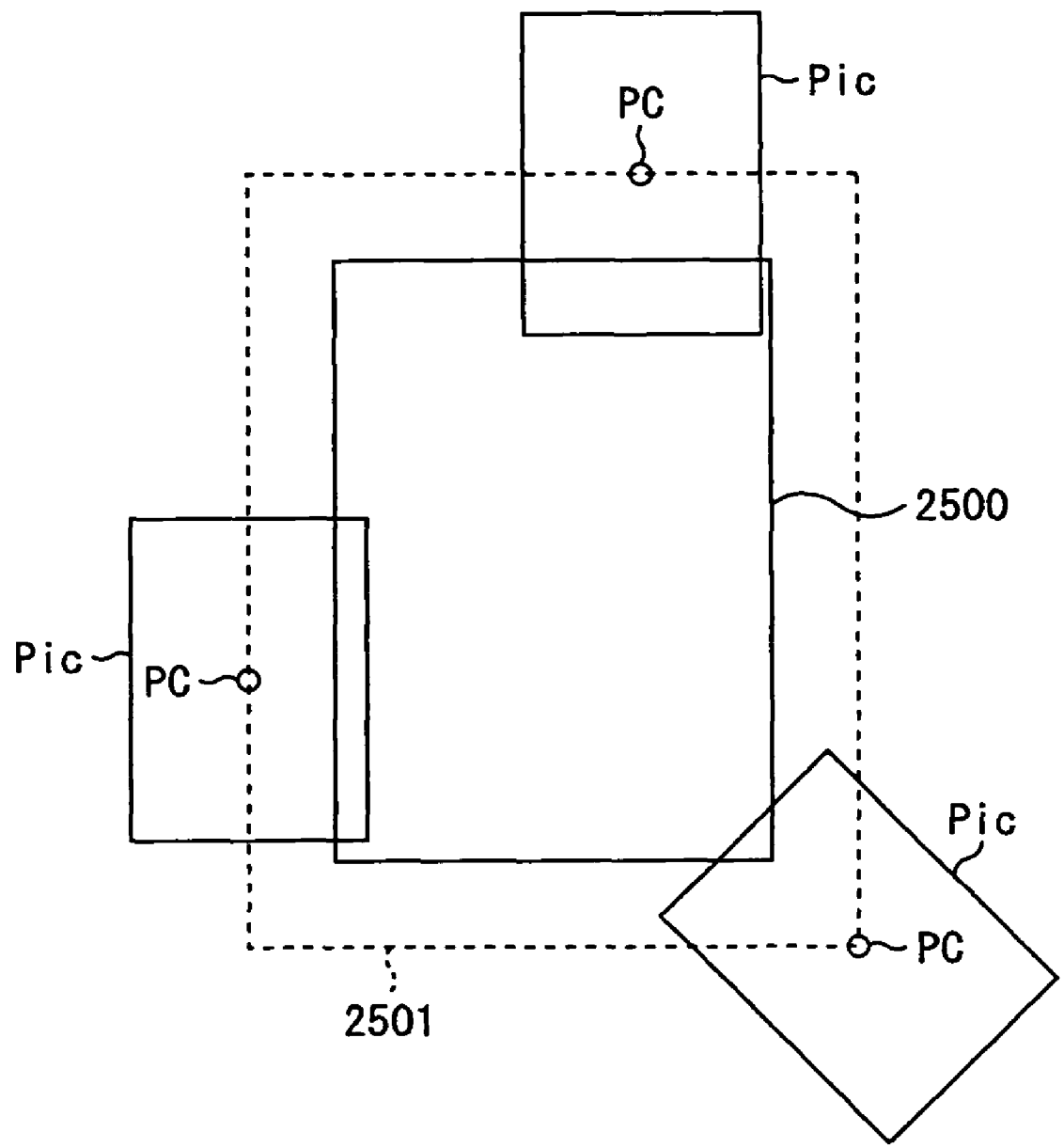
FIG. 25 is a schematic diagram for use in description of an image editable range.

As shown in FIG. 25, the CPU 1920 virtually recognizes an image movable range 2501 slightly larger than a display range 2500 of the display section 1700, and monitors whether the central coordinates of the editing image Pic fall within the image movable range 2501. When it determines that a press operation causes the central coordinates to go out of the image movable range 2501, it ignores the move operation and does not move the image. Thus, the CPU 1920 prevents the move operation from moving the image to the outside of the display range 2500 of the display section 1710 and failing to display the image.

In the image editing processing, the CPU 1920 performs different processing in accordance with a short or long press operation on the dial 2047 and the central button 2035. Specifically, when a momentary press operation (hereinafter this is referred to as a single press operation) on the dial 2047 is applied in the both operation modes of the rotation mode and the scaling mode, the CPU 1920 moves the image by a predetermined reference movement amount for each single operation. In contrast, when a long press operation is applied on the dial 2047, the CPU 1920 moves the image by the aforementioned reference movement amount for a predetermined reference repetition time period (for example, 0.5 seconds) while the long press operation is continued. This reference movement amount can be arbitrarily changed by a user.

In the both operation modes of the rotation mode and the scaling mode, when the central button 2035 is long pressed, the CPU 1920 switches the operation modes as described above. In contrast, when the central button 2035 is single-pressed, the CPU 1920 confirms the image editing and ends the image editing processing.

(5) Operation Example of Image Editing Processing

Next, an operation example of actual image editing processing in the mobile phone 1700 is described.

Figure 26:
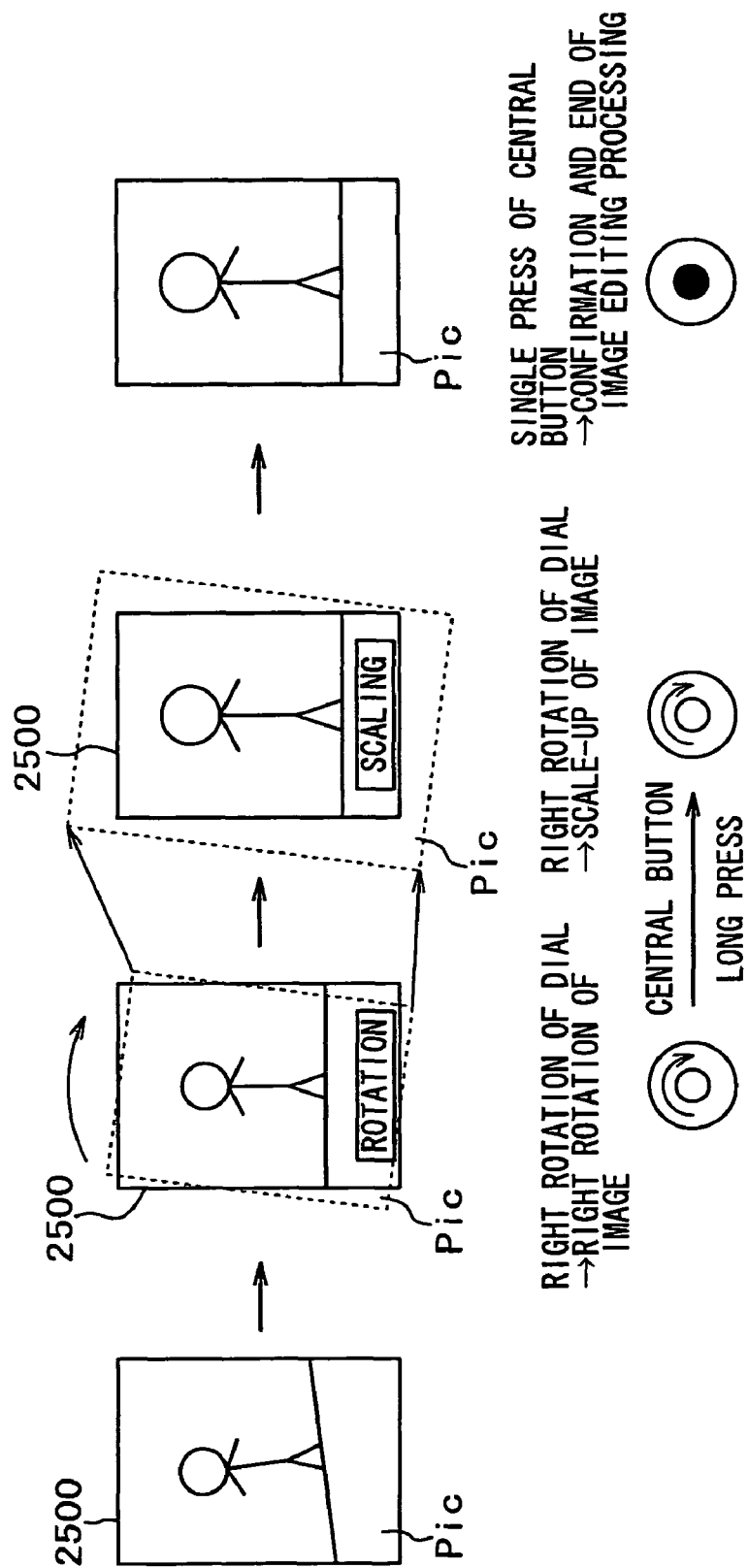
FIG. 26 is a schematic diagram for use in description of an image editing operation.

FIG. 26 shows an operation example when the inclination of the image Pic (in FIG. 26A) captured by the camera section 1713 of the mobile phone 1700 is modified. In this case, the image Pic and the display range 2500 of the display section 1700 have the identical sizes.

When a start operation of image editing processing is input by a user, the CPU 1920 starts the image editing processing in the rotation mode as shown in FIG. 26B. When the dial 2047 is rotationally operated in the right-handed direction in this state, the CPU 1920 rotates the image Pic in the right-handed direction in response thereto for display.

When the image Pic having the same size as the display range 2500 of the display section 1700 is rotated, a blank portion occurs in which no image is displayed in the display section 1700. In this case, the blank portion can be filled if the operation mode is switched to the scaling mode to scale up the image Pic after rotation.

Specifically, when the central button 2035 is long pressed, the CPU 1920 switches the operation mode to the scaling mode in response thereto (in FIG. 26C). In this state, when the dial 2047 is rotationally operated in the right-handed direction, the CPU 1920 scales up the image Pic in response thereto. Then, the CPU 1920 confirms the image editing and ends the image editing processing in response to a single operation on the central button 2035 (in FIG. 26D).

In this manner, the user can easily perform the processing of rotating the image Pic to modify the inclination and scaling up the image Pic to fill the blank portion occurring in association with the image rotation only by operating the disc jog 1709.

Figure 27:
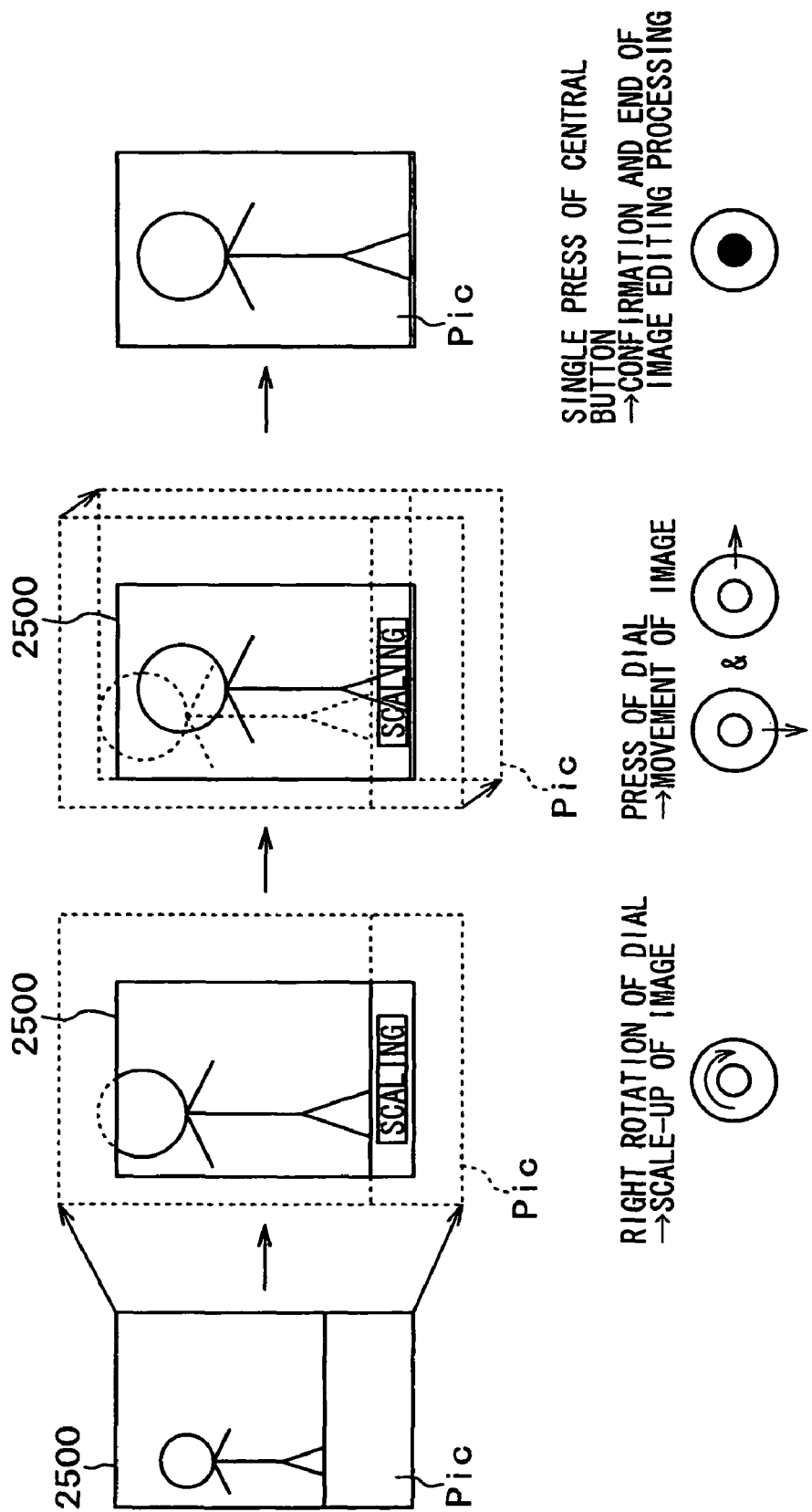
FIG. 27 is a schematic diagram for use in description of the image editing operation.

Next, description is made for an operation when an arbitrary portion of the image Pic (in FIG. 27A) captured by the camera section 1713 is scaled up and displayed over the entire display section 1710 with reference to FIG. 27.

When a user inputs a start operation of image editing processing, the CPU 1920 starts the image editing processing in the rotation mode as shown B in FIG. 27. When the dial 2047 is rotationally operated in the right-handed direction in this state, the CPU 1920 scales up the image Pic in response thereto.

After the image Pic is scaled up to an arbitrary size in this manner, the dial 2047 is pressed in upper, down, left, and right directions to move the image Pic, thereby making it possible to display the arbitrary portion in the image Pic at the center of the display section 1710.

Specifically, as shown in FIG. 27C, when the dial 2047 is pressed, the CPU 1920 moves the image Pic in response thereto. Then, in response to a single operation on the central button 2035, the CPU 1920 confirms image editing and ends the image editing processing (in FIG. 27D).

In this manner, the user can easily perform processing of scaling up the arbitrary portion of the image Pic for display over the entire display section 1710 only by operation the disc jog 1709.

(6) Image Editing Processing Procedure

Figure 28:
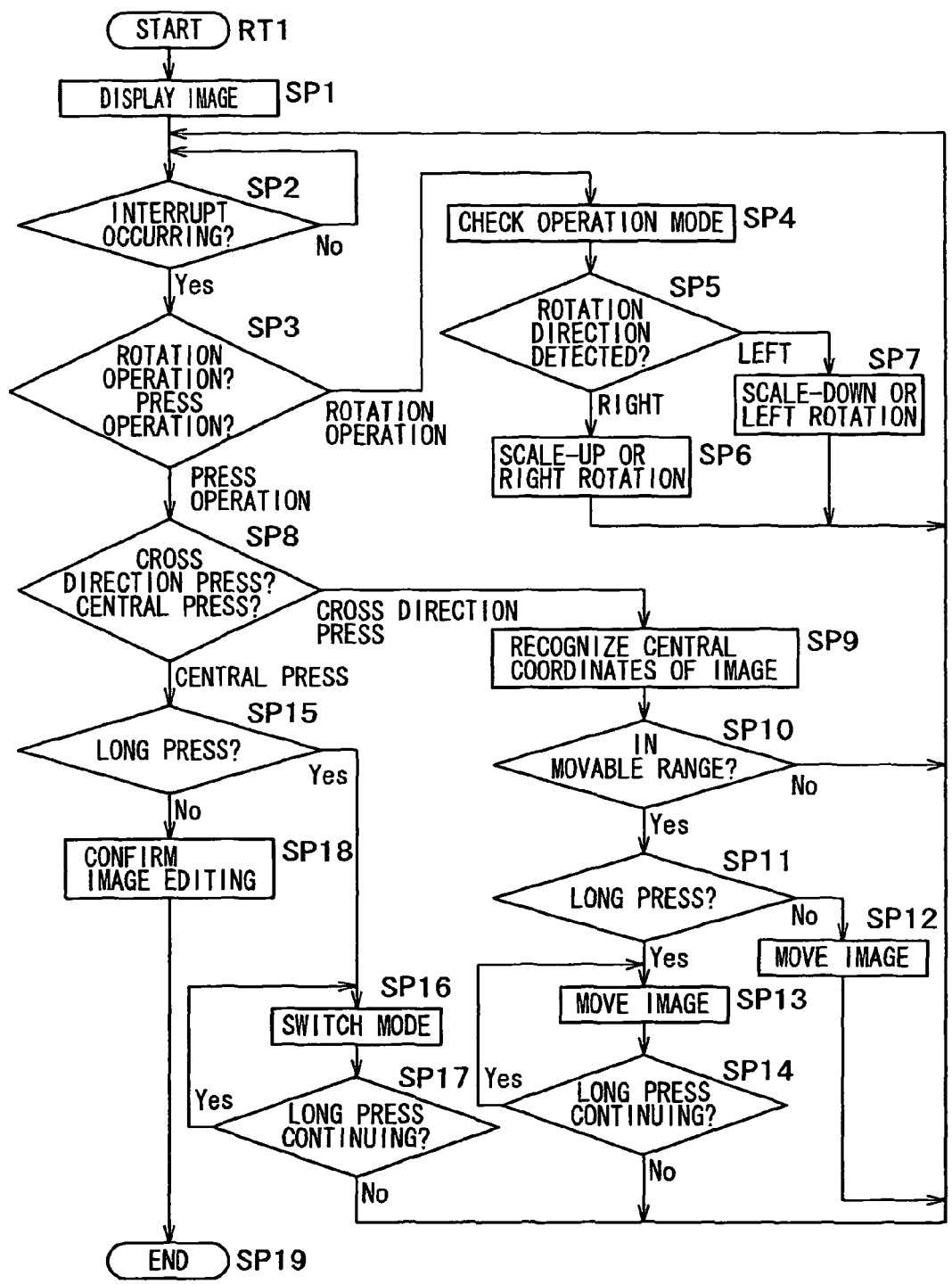
FIG. 28 is a flow chart showing an image editing processing procedure.

Next, the processing procedure for performing the aforementioned image editing processing is described in detail with reference to a flow chart shown in FIG. 28.

When the "image edit" menu is selected on the main menu screen, the CPU 1920 serving as image processing means reads an image editing program from the ROM 1923 for execution. On the basis of this program, the CPU 1920 moves to the image editing mode and starts a start step of a routine RT1 in an image editing processing procedure shown in FIG. 28 to perform processing at step SP1. At this point, the CPU 1920 sets the operation mode as the rotation mode. At step SP1, the CPU 1920 displays the aforementioned image editing screen 2400 in the display section 1700 and displays an image to be edited in the image editing screen 2400, and then moves to the next step SP2.

At step SP2, the CPU 1920 determines presence or absence of operation of the disc jog 1709 by a user on the basis of the presence or absence of interrupt from the disc jog driver. When the interrupt occurs, the CPU 1920 determines that the disc jog 1709 is operated and moves to the next step SP3.

At step SP3, the CPU 1920 determines whether the operation applied to the disc jog 1709 is a rotation operation or a press operation. Then, when it is determined that the operation applied to the disc jog 1709 is a rotation operation at step SP3, the CPU 1920 moves to processing at step SP4.

At step SP4, the CPU 1920 checks the current operation mode and moves to the next step SP5 where it detects a direction of the rotation operation of the disc jog 1709. When the CPU 1920 determines that the disc jog 1709 is rotationally operated to the right at step SP5, it moves to step SP6 where it scales up the image (in the scaling mode) or rotates the image to the right (in the rotation mode) in accordance with the amount of the rotation operation, and returns to step SP2. In contrast, when it is determined that the disc jog 1709 is rotationally operated to the left at step SP5, the CPU 1920 moves to step SP7 where it scales-down the image (in the scaling mode) or rotates the image to the left (in the rotation mode) in accordance with the amount of the rotation operation, and returns to step SP2.

In this manner, the CPU 1920 serving as the image processing means rotates or scales up/down the image Pic in accordance with the rotation operation on the dial 2047.

On the other hand, when the CPU 1920 determines that the operation applied to the disc jog 1709 is a press operation at step SP3, it moves to step SP8 where it determines whether the press operation applied to the disc jog 1709 is a cross direction press operation on the dial 2047 or a cross direction press operation on the central button 2035.

When the CPU 1920 determines that the operation applied to the disc jog 1709 is a cross direction press operation on the dial 2047 at step SP8, it moves to step SP9 where it recognizes the central coordinates of the currently displayed image Pic and then moves to the step SP10.

Then, at step SP10, the CPU 1920 determines whether or not the center of the image Pic falls within the range of the aforementioned image movable range 2501 when the image Pic is moved in accordance with the cross direction press operation.

When a negative result is provided at step SP10, the CPU 1920 returns to step SP2 without moving the image Pic. This means that moving the image Pic in accordance with the cross direction press operation causes the center of the image Pic to go out of the range of the image movable range 2501. In contrast, when a positive result is provided at step SP10, the CPU 1920 moves to step SP11. In other words, this means that the center of the image Pic falls within the range of the image movable range 2501 even when the image Pic is moved in accordance with the cross direction press operation.

At step SP11, the CPU 1920 determines whether or not the cross direction press operation applied to the dial 2047 is a long press operation. When a negative result is provided at step SP11, the CPU 1920 moves to step SP12 where it moves the image Pic by the aforementioned reference movement amount in the direction of the press operation (upward, downward, left or right) and returns to step SP2. This means that the cross direction press operation applied to the dial 2047 is a single press operation.

In contrast, when a positive result is provided at step SP11, the CPU 1920 moves to step SP13. This means that the cross direction press operation applied to the dial 2047 is a long press operation.

At step SP13, the CPU 1920 moves the image Pic by the aforementioned reference movement amount in the direction of the press operation, and then moves to step SP14. At step SP14, the CPU 1920 determines whether or not the long press operation on the dial 2047 continues. When it is determined that the long press operation continues at step SP14, the CPU 1920 returns to step SP13 where it moves the image again, while the CPU 1920 returns to step SP2 when it is determined that the long press operation does not continue at step SP14.

In this manner, the CPU 1920 serving as the image processing means moves the image Pic in accordance with the cross direction press operation on the dial 2047.

On the other hand, when the CPU 1920 determines that the operation applied to the disc jog 1709 is a center press operation on the central button 2035 at step SP8, it moves to processing at step SP15. At step SP15, the CPU 1920 determines whether or not the center press operation is a long press operation. When a positive result is provided at step SP15, the CPU 1920 moves to step SP16. This means that a long press operation is applied to the central button 2035.

At step SP16, the CPU 1920 switches the editing mode from the rotation mode to the scaling mode, or from the scaling mode to the rotation mode, and then moves to the next step SP17. At step SP17, the CPU 1920 determines whether or not the long press operation on the central button 2035 continues. When it is determined that the long press operation continues at step SP17, the CPU 1920 returns to step SP17 where it again switches the modes. In contrast, when it is determined that the long press operation does not continues at step SP17, the CPU 1920 returns to step SP2.

When a negative result is provided at step SP15, the CPU 1920 moves to step SP18 where it confirms the image editing on the image Pic, and moves to step SP19 to end the image editing processing. In other words, this means that the single press operation is applied to the central button 2035.

(7) Operation and Effects

In the aforementioned configurations, the CPU 1920 of the mobile phone 1700 rotates the image Pic to be edited in accordance with the rotation operation on the dial 2047 of the disc jog 1709 when the operation mode is the rotation mode in the image editing mode. When the operation mode is the scaling mode, the CPU 1920 scales up or down the image Pic in accordance with the rotation operation on the dial 2047. This allows instinctive and easy operations of rotation or scaling of an image.

Particularly, since the rotation axis direction of the dial 2047 substantially matches the rotation axis direction of the image Pic in the image editing processing in the mobile phone 1700, a user can be provided with an instinctive and real operation feel as if he could rotate the image Pic with his finger.

As described above, the disc jog 1709 enables fast and easy input of continuous operations only by rotationally operating the dial 2047 and input at an arbitrary speed in accordance with the rotation speed of the dial 2047 as compared with a conventional input method using keys. Thus, in the mobile phone 1700, it is possible to reduce the reference rotation angle or the reference scale-up/scale-down rate for each operation (one rotation click of the dial 2047) as compared with a conventional input method using keys, thereby making it possible to perform precise image editing than a conventional example.

In this manner, the CPU 1920 of the mobile phone 1700 can move the image Pic to be edited in accordance with the cross direction press operation on the dial 2047 of the disc jog 1709 in both the operation modes of the rotation mode and the scaling mode. In addition, the CPU 1920 of the mobile phone 1700 can switch the operation modes in response to the long press operation on the central button 2035 in both the operation modes of the rotation mode and the scaling mode and can end the image editing mode in response to the single press operation on the central button 2035.

In this manner, in the mobile phone 1700, it is possible to input various image processing operations such as a moving operation of an image, switch of the operation modes, and an end operation of the image editing mode in addition to a rotation operation and a scaling operation of an image by using the disc jog 1709 only.

In addition, in the mobile phone 1700, since a user can arbitrarily change the reference rotation angle and the reference scale-up/scale-down rate for one rotation click of the dial 2047, and the reference movement amount for a cross direction press operation of the dial 2047 as described above, the responsiveness of the disc jog 1709 can be adjusted according to user's preference. For example, the reference rotation angle may be set to be small when precise angle setting is desired.

Furthermore, in the disc jog 1709, the dial 2047 and the central button 2035 are formed to be compact and integral, so that the mobile phone 1700 can be reduced in size and various operations can be input only by one finger (for example, a thumb), thereby allowing improved operability of the mobile phone 1700.

According to the aforementioned configurations, a rotation operation, a scaling operation, a moving operation of an image to be edited, switch of operation modes, and an end operation of an image editing mode can be input through the disc jog 1709 with which a rotation operation, a cross direction press operation, and a central press operation can be input. Thus, image editing can be performed only by operating the disc jog 1709.

In addition, an image to be edited is rotated or scaled in accordance with a rotation operation on the dial 2047 of the disc jog 1709, so that the reference rotation angle or the reference scale-up/scale-down rate can be reduced for one operation input to perform more precise image editing than a conventional example.

(8) Other Embodiments

In the aforementioned second embodiment, an image is rotated and scaled in accordance with a rotation operation of the disc jog 1709. However, the present invention is not limited thereto, and various processing in image editing processing may be operated by the disc jog 1709. For example, FIG. 29 shows a case where a frame F1, F2, or F3 is selected for an image Pic for combination. In this example, the image Pic is moved in accordance with a cross direction press operation on the dial 2047 of a disc jog 1709, and the frame can be selected in accordance with a rotation operation on the dial 2047. In this manner, selection of a frame and positioning of an image in the frame can be operated only by the disc jog 1709.

When various parameters such as luminance and hue of an image Pic can be changed by the disc jog 1709, such parameters can be readily changed through easy operations.

In addition, while a press operation in four directions of upward, downward, leftward, and rightward directions can be input on the dial 2047 of the disc jog 1709 in the aforementioned second embodiment, the present invention is not limited thereto, and a press operation in other directions such as upper-right, lower-right, upper-left, and lower-left directions may be input in addition to the four directions of the upper, lower, left, and right directions.

While it is determined whether image movement is possible or not on the basis of the preset image movable range 2501 in the aforementioned second embodiment, the present invention is not limited thereto, and a user can arbitrarily change the image movable range. In this case, the image movable range can be set according to user's preference to further improve operability in image editing processing.

In addition, while the aforementioned second embodiment has been described for the case where the present invention is applied to the mobile phone 1700 having the disc jog 1709, the present invention is not limited thereto. The present invention can be applied to various apparatuses, for example an information processing apparatus such as a PDA (Personal Data Assistant) and a personal computer, a digital camera and the like, as long as an apparatus has a disc jog and an image editing function.

INDUSTRIAL AVAILABILITY

According to the present invention, display can be controlled.

Also, according to the present invention, various input operations can be performed more comfortably, accurately and efficiently.

In addition, according to the present invention, operations with a sense of synchronization with display of a screen can be performed.

The invention claimed is:
1. An image processing apparatus comprising:
operation means rotatable around a rotation axis and having a rotation body which can be moved in a direction substantially in parallel with the rotation axis;
rotation detection means for detecting rotation of said rotation body;
press detection means for detecting movement of said rotation body in the direction in parallel with the rotation axis; and display control means for controlling display of an image, and characterized in that said display control means rotates and displays said image in accordance with the rotation of said rotation body detected by said rotation detection means and switches and displays the said image in accordance with a result of detection by said press detection means.

2. The image processing apparatus according to claim 1, wherein:
said press detection means is capable of detecting the movement at a plurality of points of said rotation body, and
said display control means is moves and displays said image corresponding to a position where said press detection means detects the movement.

3. The image processing apparatus according to claim 1, wherein:
said press detection means can detect a movement of said rotation axis, and
said display control means performs predetermined processing on said image when said press detection means detects the movement of said rotation axis.

4. The image processing apparatus according to claim 3, further comprising a rotation mode for rotating said image and a resize mode for changing a size of said image.

5. The image processing apparatus according to claim 4, wherein said display control means performs:
processing of rotating and displaying said image in accordance with the rotation of said rotation body detected by said rotation detection means in a case where a mode of said image processing apparatus is the rotation mode, and
processing of scaling up/down said image in accordance with the rotation of said rotation body detected by said rotation detection means in a case where the mode of said image processing apparatus is the resizing mode.

6. The image processing apparatus according to claim 3, further comprising timer means for measuring a time period for which said rotation axis is moved, and wherein said display control means switches said processing on the basis of the time period for which said rotation axis is moved measured by said timer means when said press detection means detects the movement of said rotation axis.

7. The image processing apparatus according to claim 4, further comprising timer means for measuring a time period for which said rotation axis is moved, and wherein, when said press detection means detects the movement of said rotation axis, said display control means confirms said processing in a case where the time period for which said rotation axis is moved measured by said timer means is shorter than a predetermined time period, and performs processing of switching a mode of said image processing apparatus from said rotation mode to said resize mode in a case where the time period for which said rotation axis is moved measured by said timer means is longer than said predetermined time period.

8. The image processing apparatus according to claim 1, wherein said display control means controls displaying of a planar image as said image and displays said planar image after rotating in a counterclockwise direction or a clockwise direction around a center of the image in accordance with the rotation of said rotation body detected by said rotation detection means.

9. The image processing apparatus according to claim 1, wherein said display control means controls displaying of a three-dimensional image in a virtual space as said image and displays said three-dimensional image after rotating in a horizontal plane in said virtual space setting a current position in said virtual space as reference in accordance with the rotation of said rotation body detected by said rotation detection means.

10. The image processing apparatus according to claim 9, wherein:
said press detection means is capable of detecting the movement at a plurality of points of said rotation body, and
said display control means is scales up/down and displays said three-dimensional image corresponding to a position where said press detection means detects the movement.

11. An image processing program, embodied on a computer readable medium, executed by a computer which controls an image processing apparatus having:
operation means rotatable around a rotation axis and having a rotation body which can be moved in a direction substantially in parallel with the rotation axis,
rotation detection means for detecting rotation of said rotation body,
press detection means for detecting movement of said rotation body in the direction in parallel with the rotation axis, and
display control means for controlling display of an image, said image processing program is comprising the steps of:
rotating and displaying the said image in accordance with rotation of said rotation body detected by said rotation detection means, and
switching and displaying the said image in accordance with a result of the detection by said press detection means.

12. An image processing method performed by an image processing apparatus having:
operation means rotatable around a rotation axis and having a rotation body which can be moved in a direction substantially in parallel with the rotation axis,
rotation detection means for detecting rotation of said rotation body,
press detection means for detecting movement of said rotation body in the direction in parallel with the rotation axis, and display control means for controlling display of an image, said image processing method comprising the steps of:
rotating and displaying said image in accordance with the rotation of said rotation body detected by said rotation detection means, and
switching and displaying said image in accordance with a result of the detection by said press detection means.

* * * * *